4,217-121 SR
12/27/83 OR 4,423,304

United States Patent [19]

Bass et al.

[11] 4,423,304

[45] Dec. 27, 1983

[54] PLASMA WELDING TORCH

[76] Inventors: Harold E. Bass, Rte. 1, Box 31F, Washington, Okla. 73093; James L. Bass, 75 Dufault St., Putnam, Conn. 06260; Richard E. Bass, P.O. Box 44, Washington, Okla. 73093; Peter J. Bass, P.O. Box 128, Dilley, Tex. 78017; Charles E. Bass, 3613 Trinidad, Norman, Okla. 73069

[21] Appl. No.: 236,141

[22] Filed: Feb. 20, 1981

[51] Int. Cl.[3] .................. B23K 9/00

[52] U.S. Cl. .................. 219/121 PM; 219/121 PR; 219/121 PP; 219/75; 313/231.31

[58] Field of Search .................. 219/121 PL, 121 PM, 219/121 PP, 121 PR, 121 P, 121 PA, 74, 75, 76.16; 313/231.3-231.7

[56] References Cited

U.S. PATENT DOCUMENTS

| | | | |
|---|---|---|---|
| 1,815,570 | 7/1931 | Jones . | |
| 1,929,511 | 10/1933 | Mulkey | 62/1 |
| 2,897,252 | 7/1959 | Martin | 174/35 |
| 3,280,295 | 10/1966 | Mondain-Monval et al. | 219/76 |
| 3,294,953 | 12/1966 | Spies, Jr. | 219/121 |
| 3,440,522 | 6/1969 | Muehlberger | 219/121 PR |
| 3,450,926 | 6/1969 | Kiernan | 313/231 |
| 3,521,023 | 7/1970 | Dahlman et al. | 219/75 |
| 3,632,951 | 1/1972 | Klasson | 219/121 PP |
| 3,707,615 | 12/1972 | Rotolico et al. | 219/121 P |
| 3,798,409 | 3/1974 | Troyer et al. | 219/75 |
| 4,140,892 | 2/1979 | Muller | 219/121 P |
| 4,250,373 | 2/1981 | Tanida | 219/74 |
| 4,282,418 | 8/1981 | Wuestner | 219/121 PP |

*Primary Examiner*—M. H. Paschall
*Attorney, Agent, or Firm*—Dunlap & Codding

[57] ABSTRACT

Disclosed is a transferred arc plasma torch in which a tubular anode is mounted in a bore at the lower end of a barrel of the torch, the bore being formed at a preselected angle to the axis of the barrel. The cathode is a length of tungsten rod which is held in a coaxial relation with the anode by cementing the end of an electrode holder, which mounts the cathode, into an insulating tube which extends through the barrel and forming a silicone rubber sleeve between the insulating tube and a bore formed in lower portions of the barrel such that the sleeve adheres to the insulating tube and the barrel. The silicone rubber sleeve and the cemented connection between the insulating tube and the cathode holder are formed adjacent one end of the anode so that the cemented end of the electrode holder is substantially fixed in relation to the anode. A tapered bore is formed in the electrode holder, coaxially with the anode, and a similar taper is formed on one end of the cathode so that the cathode can be inserted into the bore formed into the electrode holder. Shallow spiral grooves are formed in the tapered portion of the cathode and in the bore in the electrode holder and the tapered portion of the cathode is silver plated to enhance the grip of the electrode holder on the cathode.

29 Claims, 26 Drawing Figures

PLASMA WELDING TORCH

BACKGROUND OF THE INVENTION

1. Field of the Invention

The present invention relates generally to plasma welding torches and, more particularly, but not by way of limitation to plasma welding torches of the transferred arc type.

2. Brief Description of the Prior Art

As is common knowledge, welding is one of the basic tools that have been developed for working metal and is used in a large number of practical applications. For example, it is commonly known to join two pieces of metal by means of welding torches which heat the metal either by chemical or electrical means and, similarly, welding can be used to hard-face metal objects. Moreover, welding torches are commonly employed in metal cutting operation.

Because of the wide range of application of welding to various metal forming operations, a considerable variety of welding torches, having differeing operating characteristics and differing capabilities, have been developed. A particularly useful type of torch for many applications is the type which produces a plasma electrically to heat a work piece and/or materials which might be fed into the plasma to be added to the work piece. As noted in U.S. Pat. No. 3,148,263 issued Sept. 8, 1964 to Jensen, the plasma produced by such a torch will often reach temperatures in the range of 10,000° F. to 35,000° F. so that the torch can be used to melt alloys which have very high melting points. Moreover, the plasma is capable of carrying very high electrical currents so that plasma torches can be constructed to very rapidly and efficiently perform a variety of jobs. For example, it is not uncommon to construct plasma torches to operate with currents of thousands of amperes passing through the plasma produced thereby.

A basic problem with plasma torches is that, because of the temperture of the plasma and the current carried thereby, the plasma can severely erode electrodes by means of which current is supplied to the plasma with the result that the torch has only a very limited operating lifetime. A solution to this problem, which can be employed in many circumstances, is to use a transferred arc scheme of operation. In such a scheme, a central electrode, which can be made of a refractory material such as thoriated tungsten and which can be mounted in the torch to permit replacement thereof, is positioned along the axis of a second electrode which is tubular in form. In use, an arc is first established between the two electrodes to initially form a plasma in a gas that flows therebetween and the arc is then transferred to the work piece; that is, a main current carried by the torch is established between the central electrode and the work piece. Since the central electrode is formed of a refractory material that can be replaced and since the tubular electrode is not subjected to erosive effects that would occur where the main current might be passed thereto, such a torch will have a substantially indefinite lifetime.

An important consideration in constructing a transferred arc torch is that the alignment between the electrodes be maintained in a substantially coaxial relation despite heating of portions of the torch near the plasma, such heating occurring when the torch is used. Should the two electrodes become misaligned, the main arc can jump back to the tubular electrode with the result that severe erosion of such electrode can occur. Indeed, such erosion, if permitted to continue for even a relatively short time, can result in extensive damage to, or even destruction of, the tubular electrode.

The need for maintaining the alignment of the two electrodes in a transferred arc type plasma torch and thermal expansion effects, which tend to disrupt such alignment, has generally resulted in limitations on the applications of torches of this type or difficulties in their use. A particular problem area has been in the use of transferred arc welding torches in applications in which the plasma jet issuing therefrom must be directed against the wall of a confined space. Torches which direct the jet axially of an elongated member which can be inserted into the space, while generally not subject to electrode misalignment problems, often do not permit the plasma to be properly directed within the space for the purpose at hand. While the problem can be overcome, without introducing electrode alignment problems, by mounting a welding head on an elongated structure, such welding heads tend to be bulky so that limits are placed on the size of the space that the torch can enter. Thus, prior to the present invention, it has generally not been possible to effectively employ transferred arc plasma welding in many applications wherein welding is to be done inside a small space; for example, where portions of the inside of a valve are to be hardfaced, an application for which transferred plasma welding would be particularly appropriate, in the absence of the above problems, because of the temperature and current capabilities available in this type of welding process.

SUMMARY OF THE INVENTION

The present invention provides a transferred arc plasma torch which overcomes these problems by mounting the central electrode of such a torch in a manner that directs the plasma jet at a selected angle to an elongated body of the torch while, at the same time, eliminating electrode misalignment problems, arising from thermal expansion, that could result in damage to the tubular electrode of the torch. To this end, the torch of the present invention comprises a tubular barrel having the tubular electrode of the torch fixed in one end thereof about an axis which is oriented at a preselected angle to the axis of the barrel. An elongated electrode holder, extends through the barrel to terminate adjacent one end of the tubular electrode and means are provided for securing the end of the electrode holder adjacent the tubular electrode to the barrel with the result that the spatial relation between such end of the electrode holder and the tubular electrode remains substantially fixed despite thermal expansion of portions of the torch near the electrodes. That is, because of the proximity of portions of the barrel to which each of the tubular electrode and electrode holder are secured, thermal expansion will have negligible effects on the relative positions of the tubular electrode and the end of the electrode holder positioned adjacent thereto. The central electrode of the torch is then mounted in a preformed bore in the electrode holder that is coaxial with the tubular electrode.

An object of the present invention is to provide a transferred arc plasma torch in which electrode alignment is effectively independent of thermal expansion of the materials of which the torch is constructed.

Another object of the present invention is to provide a transferred arc plasma torch wherein the plasma jet can be directed at an angle to the longitudinal axis of the torch.

Still another object of the present invention is to provide a transferred arc plasma torch which combines small lateral dimensions with a side directed plasma jet.

A further object of the present invention is to provide a transferred arc plasma torch which can direct the plasma jet formed thereby against the side of confined spaces.

Other objects, advantages and features of the present invention will become clear from the following detail description of the preferred embodiment of the invention when read in conjunction with the drawings and appended claims.

BRIEF DESCRIPTION OF THE DRAWINGS

FIG. 9 is a cross-section in side elevation and partial cutaway of a portion of a third embodiment of a torch constructed in accordance with the present invention.

DESCRIPTION OF FIGS. 1 THROUGH 14

Figure 1:
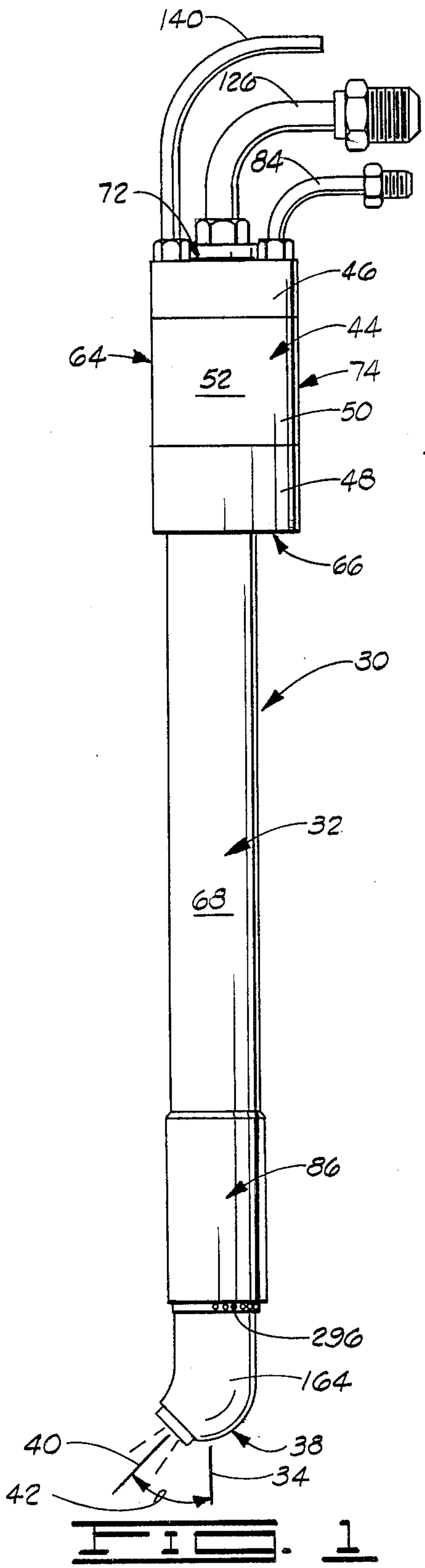
FIG. 1 is a side elevational view of one preferred embodiment of the plasma torch of the present invention.

Referring now to FIGS. 1 through 14 in general, and to FIG. 1 in particular, shown therein and designated by the general reference numeral 30 is a transferred arc plasma torch constructed in accordance with the present invention. In general, the torch 30 comprises an elongated barrel 32 extending along a longitudinal axis 34 between upper and lower ends, 36 (FIG. 3) and 38 respectively, thereof. As will be discussed below, the barrel 32 supports a pair of electrodes near the lower end 38 thereof and such electrodes are positioned to direct a plasma jet from the lower end 38 of the barrel 32 generally along an axis 40 which is disposed at a preselected angle 42 to the longitudinal axis 34 of the barrel 32. In the embodiment shown in FIGS. 1 through 14, the angle 42 is selected to be approximately 45°.

Figure 2:
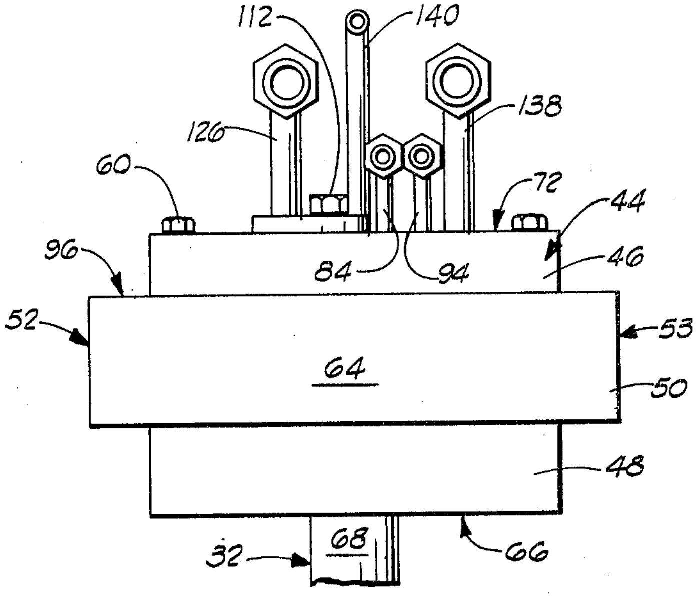
FIG. 2 is a rear elevational view of the distribution manifold of the torch of FIG. 1.
Figure 3:
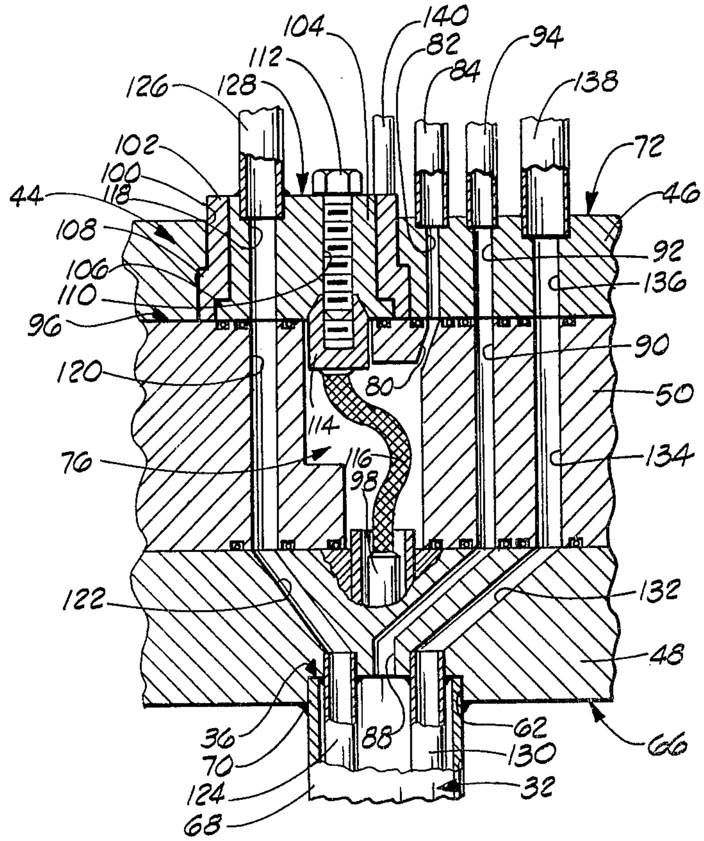
FIG. 3 is a schematic, elevational cross-section of the distribution manifold, as seen from the rear thereof, generally illustrating fluid and electrical connections to the torch of FIG. 1.
Figure 4:
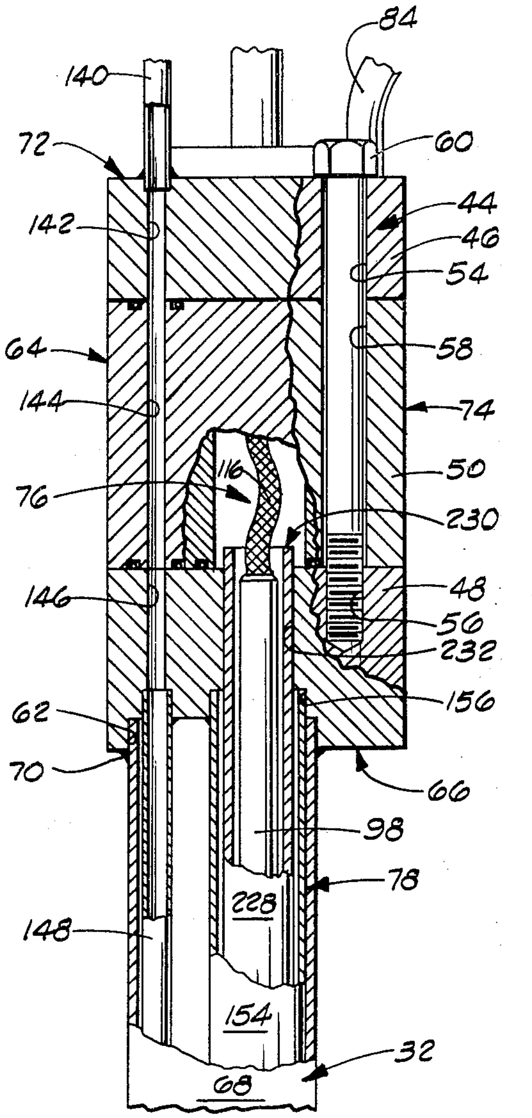
FIG. 4 is an elevational, bi-level cross-section of the distribution manifold of the torch of FIG. 1 as seen from the side thereof shown in FIG. 1.

During operation of the torch 30, several fluids enter and leave the torch 30, for purposes which will be discussed below, and a fluid distribution manifold 44, shown in FIGS. 1 through 4, is mounted on the upper end of the torch 30 to provide fluid communication thereto. As shown in FIGS. 1 and 2, the manifold 44 generally comprises upper and lower blocks, 46 and 48 respectively, which are preferably made of metal, such as steel, and which have a generally rectangular parallelepiped form. Separating the blocks 46, 48 is an insulating, preferably plastic, spacer 50 and the manifold 44 is bolted together as has been indicated in FIG. 4. (FIG. 4 is a bi-level cross-section of the manifold 44 as seen from one side, designated 52 in FIGS. 1 and 2, thereof. Lefthand portions of FIG. 4 show a cross-section generally along the center of the manifold 44, substantially equidistant between the side 52 and an opposing side 53 shown in FIG. 2, and righthand portions of FIG. 4 show a cross-section near the side 52 of the manifold 44.) As shown in FIG. 4, holes 54, 56 and 58 are formed through the blocks 46, 48 and the spacer 50, respectively, the hole 56 in the lower block 48 being threaded so that a bolt 60 can be passed through the holes 54 and 58 and screwed into the hole 56 to clamp the blocks 46, 48 and the spacer 50 together. The bolt 60 is located near one corner of the blocks 46, 48 and, as indicated in FIG. 2, similar bolts are provided near the remaining corners of the blocks 46, 48.

As is particularly shown in FIGS. 3 and 4, a circular bore 62, slightly off center of the manifold 44 toward a front side 64 thereof (see FIGS. 1 and 2), is formed in the lower side 66 of the manifold 44 (the lower face of the lower block 48) for connecting the barrel 32 to the manifold 44. In particular, the barrel 32 comprises a tubular sleeve 68 which extends into the bore 62 and the sleeve 68 is welded or brazed to the lower block 48 as indicated at 70.

In a similar manner, a plurality of tubes are mounted in the upper side 72 of the manifold 44 (the upper face of the upper block 46) and suitable fittings are mounted on these tubes to connect to sources of fluids which are used for several purposes in the operation of the torch 30. As has been schematically indicated in FIG. 3, passages connecting with the tubes on the upper block 46 are formed through the manifold 44 to convey fluids to the barrel 32 and to conduits within the barrel 32 as will now be described. (FIG. 3 is a schematic cross-section of the manifold 44 and shows the general lateral positioning of the passages therethrough; that is, the placement of the passages between the sides 52 and 53 of the manifold 44. The passages are also formed on front-to-rear slants; that is, from the front side 64 of the manifold to an opposed rear side 74 thereof shown in FIG. 1, so that the passages will communicate with appropriate portions of the barrel 32 and conduits disposed therein. For clarity of illustration and description of the supply of fluids to the torch 30, the slanting of the passages through the manifold 44 has not been shown in the drawings.)

As is indicated in FIGS. 3 and 4, a chamber 76 is formed in the spacer 50 to overlay one side of the barrel 32 wherein is disposed an electrode holder mounting assembly, generally indicated at 78 in FIG. 4. As will be discussed below, a gas, used to form the plasma jet issuing from the torch 30, is transmitted to the lower end 38 of the torch 30 and such gas is introduced into the torch via the cavity 76. Specifically, as shown in FIG. 3, passage 80, in the spacer 50, and passage 82, in the upper block 46, connect the chamber 76 to a tube 84 which is mounted on the upper block 46 as described above and which, as shown in FIGS. 1 and 2, is provided with a suitable fitting for connecting to a supply of a suitable gas for forming the plasma. (As will be clear from FIGS. 1 and 4, the tube 84 is not in front-to-rear alignment with the chamber 76 so that the passage 82 in the upper block 46 is drilled on a slant generally toward the forward side 64 of the manifold 44 in extending toward the passage 80 from the upper face 72 of the upper block 46. O-rings, not numerically designated in the drawings, can be disposed in annular grooves, similarly not numerically designated, formed in the spacer 50 can be utilized to seal the passage 80 and the ends of the chamber 76. Similar O-rings and grooves are used to seal other passages, formed through the distribution manifold 44 as has been shown in FIGS. 3 and 4.)

During the operation of the torch, a shield gas is discharged about lower portions of the barrel 32 to protect the workpiece, as is known in the art, and a shield 86 (FIG. 1) is mounted on lower portions of the barrel 32 for this purpose. The shield gas is transmitted to the shield 86, through the tubular sleeve 68 of the torch barrel 30 about the electrode holder mounting assembly 78. The shield gas is conveniently introduced into the tubular sleeve 68 via passages 88, 90 and 92 (FIG. 3), in the lower block 48, the spacer 50, and the upper block 46 respectively, the passages 88–92 connecting to a tube 94 mounted adjacent the tube 84 on the upper face 72 of the upper block 46 as has been shown in FIG. 2.

The chamber 76 opens to the upper face 96 of the spacer 50 to provide an electrical connection to an electrode holder 98, a portion of which is shown in FIG. 3. (Portions of the electrode holer 98 and of the electrode holder mounting assembly 78, through which the electrode holder passes as shown more particularly in FIG. 4, below the lower block 48 have been deleted from FIG. 3.) The electrode holder 98 is constructed of a relatively soft metal, preferably copper, and has a general form of a rod which passes through the barrel 32 to support an electrode in lower portions thereof as will be discussed below. To provide a means of connecting an electrical power source to the electrode holder 98, a bore 100 is formed through the upper block 46, above the intersection of the chamber 76 with the upper face 96 of the spacer 50, and the bore 100 contains an annular insulator 102 and a generally cylindrical electrode block 104 disposed within the bore of the insulator 102. It is convenient to form flanges, 106 and 108, on lower portions of the insulator 102 and the electrode block 104, respectively, to mate with corresponding counterbores in lower portions of the bore 100 through the upper block 46 and of the bore of the insulator 102, as shown in FIG. 3, so that the insulator 102 and electrode block 104 are clamped between portions of the upper block 46 and the upper face 96 of the spacer 50 when the manifold 44 is assembled. A hole 110 is formed through the electrode block 104 to receive a bolt 112 which screws into a connector 114 disposed within the chamber 76. A braided wire conductor 116 is soldered between the connector 114 and the electrode holder 98 so that electrical power can be supplied to the electrode holder 98 via any suitable electrical connection to the bolt 112.

A passage 118 is formed through the electrode block 104 to align with a passage 120 through the spacer 50, the passage 120, in turn, aligning with a passage 122 through the lower block 48. The passages 118–122 are used in the supply of a coolant, preferably water, to lower portions of the torch barrel 30, as will be discussed below, and a coolant tube 124 is mounted in the lower face 66 of the lower block 48 to provide a fluid conduit to lower portions of the torch barrel 32. A tube 126 (see also FIGS. 1 and 2) having a suitable fitting for connection to a coolant supply, or drain, is mounted in the upper end 128 of the electrode block 104 to connect to the coolant tube 124 via the passages 118–122. A second coolant tube 130 is similarly mounted in the lower face 66 of the lower block 48 of the manifold 44 and extends therefrom to lower portions of the barrel 32 so that a circulation of coolant through the lower portion of the torch 30 can be provided via the coolant tubes 124 and 130. Passages 132, 134 and 136 (FIG. 3), through the lower block 48, the spacer 50 and the upper block 46, respectively, connect the coolant tube 130 to a tube 138 mounted on the upper block 46, the tube 138 having a suitable fitting for a connection to a coolant supply or drain in the same manner that the tube 126 has such a fitting so that a source of coolant can be connected to one of the tubes 126, 138 and a drain can be connected to the other of the tubes 126, 138 for circulating a coolant through the torch 30.

At times in the operation of the torch 30 it will be desired to feed a powdered material, used for hardfacing purposes, into the plasma jet and an additional tube 140 (see FIG. 4) is mounted on the upper face 72 of the upper block 46 to provide an input for such powdered material into the torch 30. The tube 140 communicates, via passages 142, 144 and 146, formed through the upper block 46, the spacer 50 and the lower block 48 respectively, with a material feed tube 148 which is mounted in the lower face 66 of the lower block 48 and extends therefrom toward the lower end 38 of the barrel 32 for this purpose. As will be described below, the material feed tube 148 opens into portions of the torch 30 wherein the plasma jet is formed and can be used for introducing a powdered material into the plasma for hardfacing purposes, as noted above, and can also be used for introducing wire welding material into the plasma jet for other welding purposes.

Figure 5:
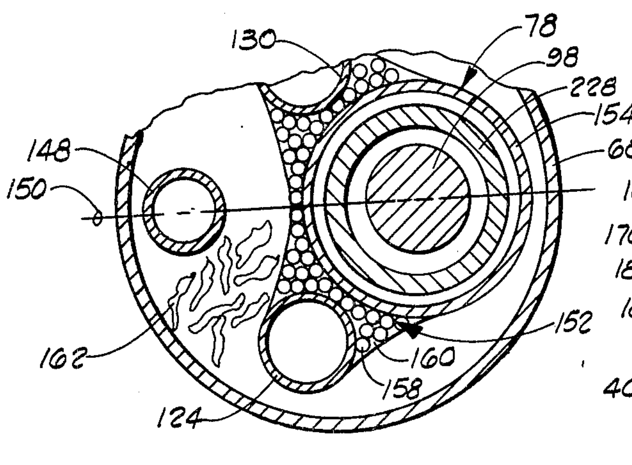
FIG. 5 is a transverse cross-section of the barrel of the torch taken along 5—5 of FIG. 6.
Figure 6:
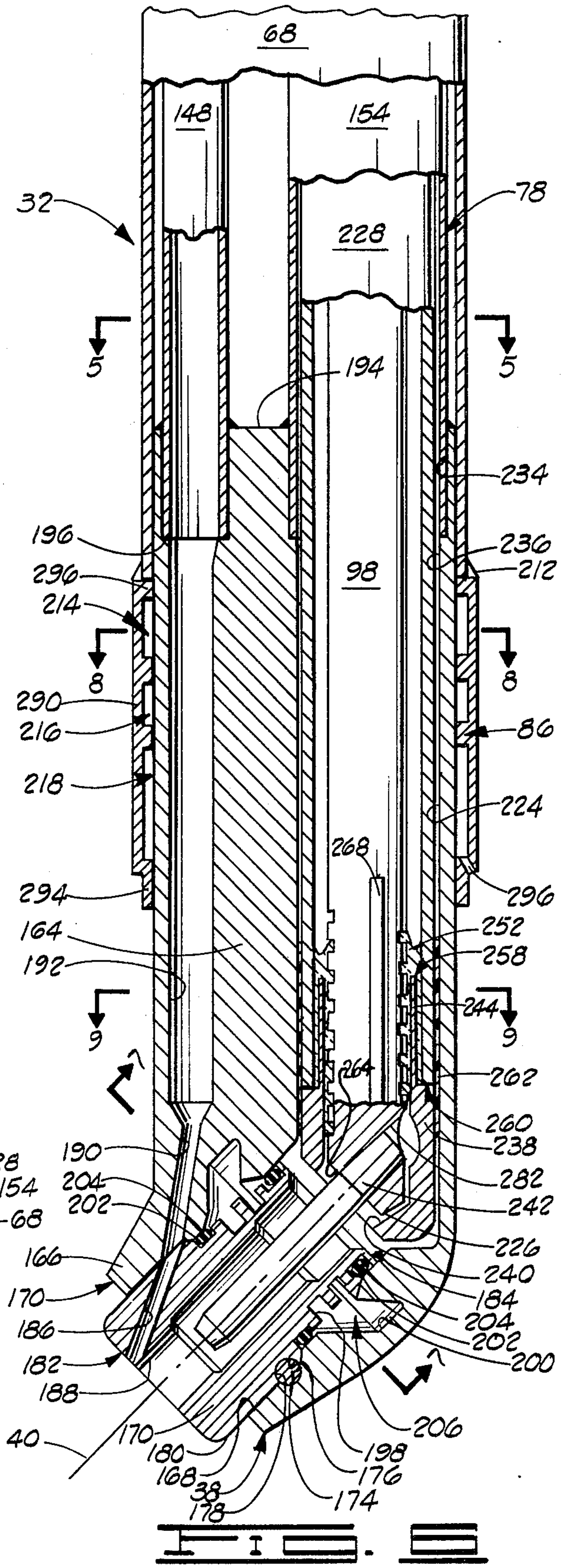
FIG. 6 is a cross-section in side elevation and partial cutaway of lower portions of the torch of FIG. 1 as seen from the side thereof shown in FIG. 1.

FIG. 5, which is a partial transverse cross-section of the barrel 32, taken along a line 5—5 of FIG. 6 which shows lower portions of the barrel 32, has been provided to show the general placement of the electrode holder mounting assembly 78, the coolant tubes 124 and 130, and the material feed tube 148 in the barrel 32 and to further show two of the novel features of the torch 30. As shown in FIG. 4, the electrode holder mounting assembly 78 is generally centered in the lower side 66 of the manifold 44 and the tubular sleeve 68 is mounted off center on the manifold 44 so that the electrode holder mounting assembly 78 will extend down one side of the tubular sleeve 68 of the barrel 32 as has been shown in FIG. 5. As will be discussed below, such placement enhances a generally compact construction of portions of the torch 30, wherein the plasma jet is formed, that is made possible by the present invention. The material feed tube 148 then extends down the opposite side of the sleeve 68 and the coolant tubes 124 and 130 are symmetrically placed to either side of a diameter 150, of the tubular sleeve 68, which passes through the centers of the material feed tube 148 and the electrode holder mounting assembly 78, the coolant tubes 124 and 130 extending generally alongside the electrode holder mounting assembly 78 through the sleeve 68.

In the operation of the torch 30 it is desirable that the temperature of the electrode holder 98 be kept relatively low and a novel feature of the present invention is the provision of a heat transfer assembly 152 which provides thermal contact between the electrode holder 98 and the coolant tubes 124 and 130. As noted above, the electrode holder 98 extends through the electrode holder mounting assembly 78 and such assembly 78 is bounded by a tubular metal sheath 154 which extends into a bore 156 (FIG. 4) which is formed in the lower block 48 inside the bore 62 by means of which the sleeve 68 is mounted on the manifold 44. (The sheath 154 is attached to the manifold 44 by welding or brazing the sheath 154 to the lower block 48 of the manifold in the same manner that the sleeve 68 is welded or brazed thereto.) The heat transfer assembly 152 comprises a plurality of copper wires 158 which are disposed generally between adjacent portions of the sheath 154 and the coolant tubes 124, 130, such wires extending generally parallel to the longitudinal axis of the sheath 154 and the coolant tubes 124 and 130. The heat transfer assembly 152 further comprises a solder matrix 160 which coats portions of the sheath 154 and the coolant tubes 124, 130 and which fills the interstices between the wires 158 so that the heat transfer assembly 152 provides a metal bridge, most of which is comprised of a good thermal conductor, from the coolant tubes 124, 130 to the sheath 154 to cool the interior of the sheath 154 wherein the electrode holder 98 is disposed.

As is also shown in FIG. 5, the interior of the tubular sleeve 68 of the barrel 32 is advantageously filled with metal chips 162, only a few of which have been shown in FIG. 5, so that the shield gas, which enters the sleeve 68 at the lower side of the manifold 44 as has been discussed above, will percolate through the sleeve 68 about the electrode holder mounting assembly 78 and the coolant tubes 124, 130 to further cool the electrode holder mounting assembly 78. That is, contact between the chips 162 and the electrode holder mounting assembly 78 heats the chips so that the relatively large surface area of the chips, contacted by the shield gas, provides an effective means of transferring heat from the chips to the shield gas. Such additional cooling of the electrode holder mounting assembly 78 is particularly advantageous in that it results in preheating of the shield gas which is discharged about the plasma jet, as will be discussed below, and it has been found that such preheating increases the efficiency of the torch 30.

Referring now to FIG. 6, it is seen therein that the tubular sleeve 68 terminates a distance above the lower end 38 of the barrel 32 and that the barrel comprises, in addition to the sleeve 68, a generally cylindrical block 164, preferably made of copper, which extends a short distance into the lower end of the sleeve 68, to which the block 164 is welded, and therefrom to the lower end 38 of the barrel 32. A plurality of bores and passages are formed in the cylindrical block 164, in part for receiving the electrode holder mounting assembly 78, the coolant tubes 124, 130, and the material feed tube 148. Cross-sections of the cylindrical block 164 have been shown in FIGS. 7 through 9 to facilitate the description of the system of bores and passages formed in the cylindrical block 164 and the purposes served by these bores and passages.

Figure 7:
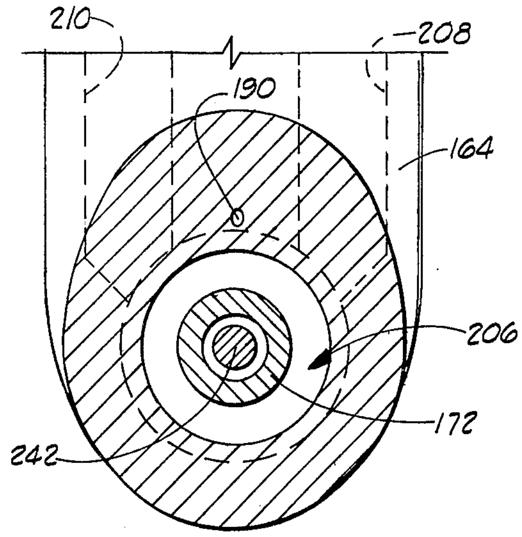
FIGS. 7, 8 and 9 are transverse cross-sections of the barrel of the torch shown in FIG. 1 taken along lines 7—7, 8—8 and 9—9 respectively of FIG. 6.
Figure 8:
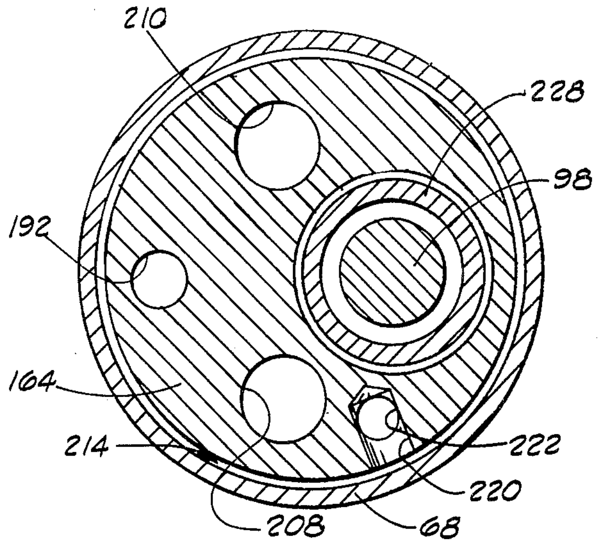

Referring first to FIGS. 6 and 7, a nozzle portion 166 of the block 164 at the lower end 38 of the barrel 32 juts out to the side of the barrel 38 opposite the side thereof along which the electrode holder mounting assembly 78 extends, the nozzle portion 166 being centered on the axis 40 along which the plasma jet is to exit the torch 30. A circular first electrode mounting bore 168, similarly centered on the axis 40, is formed in the nozzle portion 166 of the block 164, the bore 168 intersecting the distal end 170 of the nozzle portion 166 and extending a distance into the block 164. An annular first electrode 172, preferably made of copper and preferably used as an anode in the operation of the torch 30, is mounted coaxially in the bore 168 so that the axis 40 is defined by the axis of the first electrode. For this purpose, a pin 174 extends through a tranverse hole 176 formed in the nozzle portion 166 of the block 164, the pin 174 further extending along a transverse groove 178 formed in the outer periphery 180 of the first electrode 172. The first electrode 172 has an outer end 182, disposed outside the block 164, and an opposite inner end 184, disposed within the bore 168. A passage 186 is formed through portions of the first electrode 172, near the outer end 182 thereof and opposite the transverse groove 178, one end of the passage 186 intersecting the outer periphery 180 of the first electrode 172, near the center thereof, and the other end of the passage 186 intersecting the outer end 182 of the first electrode 172 and the bore 188 thereof. The passage 186 provides a means of feeding a welding material; for example, a powder used for hardfacing purposes, into the plasma jet that exits the first electrode 172 during operation of the torch 30 and, for this purpose, the passage 186 is communicated with the material feed tube 148 by passages formed in the block 164. Specifically, a passage 190 is formed in the block 164 to intersect the first electrode mounting bore 168 adjacent the passage 186, the passage 190 extending to a passage 192 which extends axially through the block 164 to intersect the upper end 194 of the block 164. A portion of the passage 192 near the upper end 194 of the block 164 is formed on an enlarged diameter to receive a portion of the material feed tube 148 adjacent the lower end 196 thereof such that the inside surface of the tube 148 mates smoothly with the periphery of remaining portions of the passage 192.

Referring once again to the first electrode 172 near the lower end 38 of the barrel 32, it will be seen in FIG.

6 that a plurality of annular grooves 198 are formed in portions of the outer periphery 180 thereof, near the inner end 184 thereof, and that an annular groove 200 is formed in the first electrode mounting bore 168 to extend about the grooves 198. Additional grooves 202 are formed in the periphery 180 of the first electrode 172, to either side of the grooves 198, and the grooves 202 contain O-rings 204 to form the grooves 198 and 200 into an annular chamber 206 extending about portions of the first electrode 172. The chamber 206 is used for cooling the first electrode 172 and, for this purpose, is communicated with the coolant tubes 124 and 130 as has been indicated in FIG. 7. As indicated therein, two passages 208 and 210, are formed in the block 164, to either side of a plane which includes the axis of the first electrode 172. The passages 208 and 210 intersect the annular chamber 206 and extend axially through the block 164 to intersect the upper end 194 (not shown in FIG. 70) thereof. The coolant tubes 124 and 130 extend into the passages 208 and 210, respectively, in the same manner that the material feed tube 148 extends into the passage 192.

Referring once again to FIG. 6, it will be seen that the shield 86, by means of which a shield gas is discharged about lower portions of the barrel 32, is mounted on the block 164 at the lower end of the tubular sleeve 68. In particular, when the torch 30 is assembled, the shield 86 is soldered to the lower end of the sleeve 68 as has been indicated at 212 in FIG. 6. The construction of the shield 86 will be discussed below with specific reference to FIG. 14; however, it should be noted at this point that the shield 86 is formed so as to coact with the periphery of the block 164 to form a series of annular compartments 214, 216 and 218 about the block 164. The shield gas which, as noted above, is introduced into the tubular sleeve 68 for transmission to the shield 86 is conveyed to the uppermost of these compartments; that is, the compartment 214, by means of passages, in the block 164, which have been shown in FIG. 8. Specifically, a transverse passage 220 is formed in the block 164 to intersect the periphery thereof within the annular compartment 214 (see also FIG. 14 wherein a cross-section of the shield 86 is shown) and the passage 220 extends a short distance into the block 164. A second passage 222 (see also FIG. 14), formed axially through the block 164, intersects the upper end 194 of the block 164 and extends thereinto a distance sufficient to intersect the passage 220 so that the compartment 214 fluidly communicates with the interior of the sleeve 68 via the passages 220 and 222.

Returning to FIG. 6, the block 164 is further provided with an axially extending bore 224 which intersects the first electrode mounting bore 168 and extends therefrom to intersect the upper end 194 of the block 164 which forms the lower portion of the barrel 32. The electrode holder 98 extends through the bore 224 and terminates in an electrode mounting end 226, which is positioned adjacent the inner end 184 of the first electrode 172, and is fixed in position within the block 164 by means of the electrode holder mounting assembly 78 as will now be described with particular reference to FIGS. 4, 6 and 9 through 12.

In addition to the sheath 154 which, as noted above, is welded to the lower block 48 of the manifold 44, the electrode holder mounting assembly 78 comprises an insulating tube 228, preferably constructed of borosilicate glass, which passes coaxially through the sheath 154 and extends outwardly of each end of sheath 154. In particular, as shown in FIG. 4, portions of the tube 228 near the upper end 230 thereof extend through a hole 232 formed through the lower block 48 of the manifold 44 and into the chamber 78 which receives plasma forming gas via the tube 84 as described above. As will be discussed in more detail below, the tube 228 thus provides a conduit for the transmission of plasma forming gas about the electrode holder 98 to the interior of the first electrode 172. As is shown in FIG. 6, the sheath 154 terminates a short distance within the bore 224 and a portion 234 of the bore 224, adjacent the upper end 194 of the block 164 is, enlarged such that the inner surface of the sheath 154 mates smoothly with a lower portion 236 of the bore 224. It will thus be seen that the tube 228 can be made to have a diameter such that only a very narrow annular space will exist between the lower portion 236 of the bore 224 and the outer periphery of the tube 228 and such construction of the tube 228 facilitates the anchoring of the electrode holder 98 in the block 164 as will be discussed shortly.

As shown in FIG. 6, the tube 228 extends to a position a short distance above the intersection of the bores 168 and 224 and the electrode holder mounting assembly 78 further comprises a ceramic collar 238 which is attached to lower portions of the tube 228 to extend to such intersection. The collar 238 has the general form of a cup which extends about the electrode mounting end 226 of the electrode holder 98, the collar 238 having a circular aperture 240 formed in the side thereof coaxially with the bore 188 of the first electrode 172 so that a rod shaped second electrode 242, generally used as a cathode in the operation of the torch and mounted in the electrode holder 98 as will be discussed below, can be extended therefrom into the first electrode 172. Upper portions 244 of the collar 238 are provided with a reduced outside diameter and the portions 244 of the collar 238 extend upwardly into lower portions of the tube 228 to facilitate the anchoring of the electrode holder 98 in a position wherein the electrode mounting end 226 thereof is disposed adjacent the inner end 184 of the first electrode 172.

Figure 9:
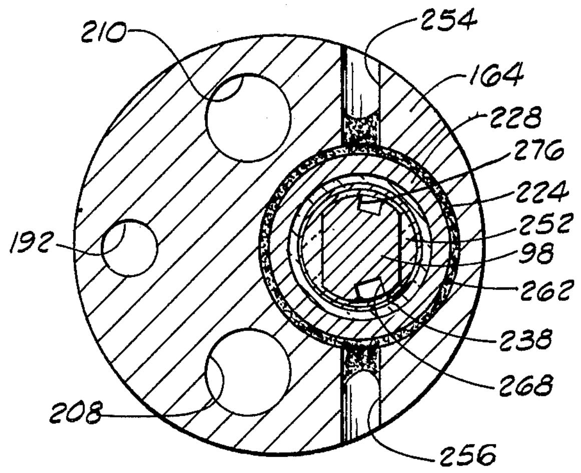
Figure 10:
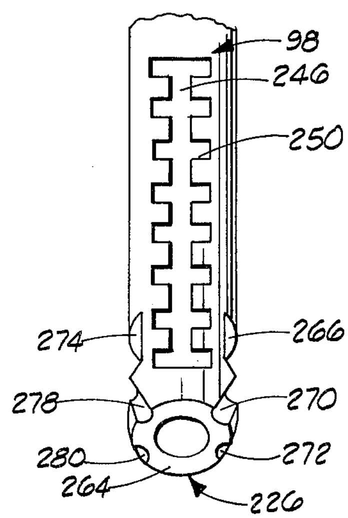
FIG. 10 is a front elevational view of a portion of the electrode holder of the torch shown in FIG. 1.
Figure 11:
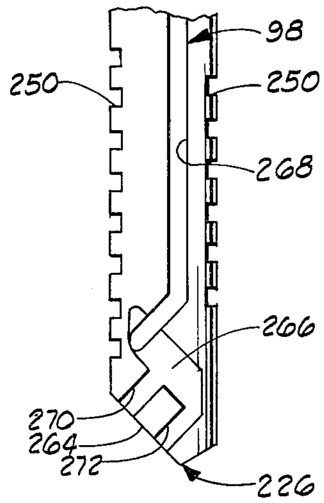
FIG. 11 is a side elevational view of the portion of the electrode holder shown in FIG. 10.
Figure 12:
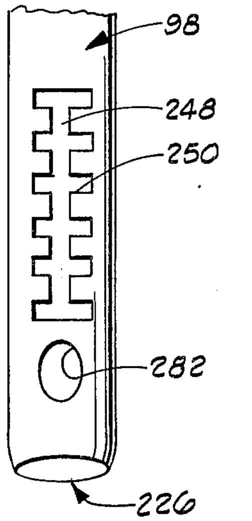
FIG. 12 is a rear elevational view of the portion of the electrode holder shown in FIG. 10.

Portions of the electrode holder 98 adjacent the electrode mounting end 226 thereof are shaped to facilitate the anchoring of the electrode holder 98 in the barrel 32 and such shaping has been shown in FIGS. 10 through 12. As shown in these Figures, channels 246 and 248 are formed in opposite sides of lower portions of the electrode holder 98 and a plurality of crosscuts 250 are formed in the periphery of the electrode holder 98 to intersect each of the channels 246 and 248. As shown in FIGS. 6 and 9, the channels 246, 248 and the crosscuts 250 are filled with a ceramic cement 252 which extends along a portion of the inner periphery of the portion 244 of the collar 238, the cement 252 extending over the upper end of the collar to the inner periphery of the insulating tube 228 such that lower portions of the electrode holder 98 and the portion 244 of the collar 238 are embedded in the cement 252, which adheres to the inner periphery of the insulating tube 228 and to the ceramic collar 238, to provide a firm connection between portions of electrode holder 98 and the inner periphery of the tube 228. The tube 228 is similarly fixed to the bore 224 formed in the block 164 of the barrel 32. In particular, as shown in FIG. 9, holes 254 and 256 are formed in the block 164 on a level slightly below the upper end 258 of the ceramic collar 238, the holes 254 and 256 intersecting the periphery of the block 164 and extending therefrom to intersect the bore 224 in which the electrode holder 98 and tube 228 are disposed. Similar holes (not shown) are formed in the block 164 on a level slightly below the lower end 260 of the insulating tube 228. The insulating tube 228 and the collar 238 are firmly fixed to the bore 224 in the block 164 by a silicone rubber sleeve 262, adhering to the tube 228, the collar 238 and the bore 224, such sleeve being formed by injecting silicone rubber cement into the bores 254 and 256 and permitting such cement to cure. In order that the sleeve 262 extend completely about the tube 228 and collar 238 in the assembled torch 30, the tube 228 and collar 238 are initially coated with silicone rubber cement prior to their insertion into the bore 224 and, after insertion, cement is injected into the holes 254, 256 until cement is discharged from the holes (not shown) disposed therebelow.

As noted above, the insulating tube 228 is used as a conduit for transmitting plasma forming gas to the bore 188 of the first electrode 172 and the lower end of electrode holder 98 is further shaped to discharge plasma forming gas in a symmetric pattern about the second electrode 242. In particular, as shown in FIGS. 6, 10 and 11, a flat surface 264 is formed on the electrode holder 98, at the electrode mounting end 226 thereof, the flat surface 264 being formed on the electrode holder 98 and the electrode holder 98 being positioned in the barrel 32 such that the surface 264 is normal to the axis of the first electrode 172. As is shown particularly in FIG. 11, a groove 266 is formed in a side of the electrode holder 98 between the two channels 246 and 248, the long axis of the groove 266 extending generally parallel to the flat surface 264. An axially extending channel 268 is formed in the electrode holder 98 above the groove 266 and the channel 268 extends to a point above the ceramic cement 252 in which portions of the electrode holder 98 are imbedded, as shown in FIG. 6, so that plasma forming gas introduced into the insulating tube 228 will be transmitted to the groove 266 along the channel 268. (The annulus between the upper portion 244 of the collar 238 and the outer periphery of the electrode holder 98 is made small so that, as shown in FIG. 9, no appreciable quantity of the ceramic cement 252 enters the channel 268 in the cementing of the electrode holder 98 to the collar 238 and insulating tube 228.) As will be clear from FIG. 6, the groove 266 will be disposed inside the collar 238 so that, with the collar 238, the groove 266 coacts with the inner surface of the collar 238 to form a plenum near the electrode mounting end 226 of the electrode holder 98. Plasma forming gas is discharged from such plenum into a plasma chamber, formed by the annulus between the bore 188 of the first electrode 172 and the periphery of the second electrode 242, via channels 270 and 272, formed in the side of the electrode holder 98 to extend between the groove 266 and the flat surface 264. As shown in FIG. 11, the channels 270 and 272 extend generally perpendicularly to the surface 264; that is, parallel to the axis of the bore 188 of the first electrode 172. A similar groove 274 (FIG. 10) is formed in the side of the electrode holder 98 opposite the side in which the groove 266 is formed, to form a second plenum and channels 276 (FIG. 9), 278 and 280 (FIG. 10) are formed in such side of the electrode holder 98 to introduce plasma forming gas into such second plenum and discharge the plasma forming gas therefrom.

Figure 13:
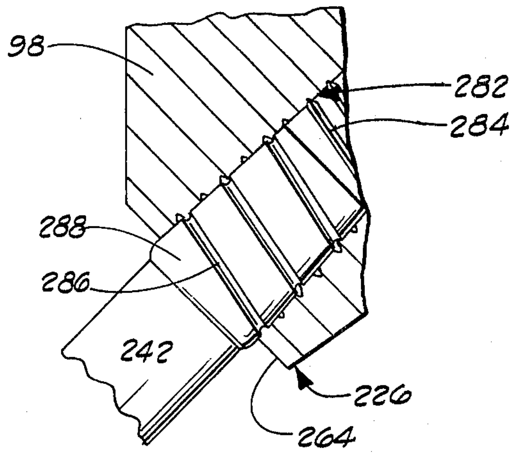
FIG. 13 is an enlarged partial cross-section in side elevation of one end of the electrode holder showing the mounting of the second electrode therein.

The second electrode 242 is mounted in the electrode holder 98 as has been particularly shown in FIG. 13. For purposes of mounting the second electrode 242, a tapered bore 282 is formed through portions of the electrode holder 98 near the electrode mounting end 226 thereof so as to intersect the flat surface 264 formed on the electrode holder 98. (The taper of the bore 282 has been exaggerated in FIG. 13 for clarity of illustration.) The axis of the bore 282 extends perpendicularly to the flat surface 264 and is positioned therein such that, when the torch 30 is assembled, the axis of the bore 282 coincides with the axis of the bore 188 of the first electrode 172. It has been found that the taper of the bore 282, in combination with forming the electrode holder 98 of a metal, such as copper, which is relatively soft compared to the relatively hard thoriated tungsten of which the second electrode 242 is constructed, can result in a tight grip on the second electrode 242, one end of which is disposed in the bore 282 as shown in FIGS. 6 and 13, by appropriate selection of the cone angle of the bore 282; that is, the angle between two lines defined by the intersection of the bore 282 with a plane including the axis of the bore 282. In particular, it has been found that cone angles of from one degree to seven degrees will generally result in a tight grip on a correspondingly tapered end of the second electrode 242. In one preferred embodiment of the torch of the present invention, shown in the drawings, the cone angle has been selected to be approximately two and one-half degrees.

It has further been found that additional features of the bore 282 and the electrode 242 can be used, either singly or in combination, to enhance the grip of the electrode holder 98 on the second electrode 242 and such features have been incorporated into FIG. 13. In particular, it has been found that the grip on the second electrode 242 can be enhanced by forming a spiral groove, as indicated at 284 in FIG. 13, in the surface of the bore 282 or by forming a spiral groove, as indicated at 286, in the tapered end of the second electrode 242, or by forming both such grooves. (The depths and pitches of the grooves 284, 286 have been exaggerated in FIG. 13 for purposes of illustration). The grip of the electrode holder 98 on the second electrode 242 is occasioned by cold working of the relatively soft metal of which the electrode holder 98 is formed and the grooves 284, 286 enhance such cold working. In particular, the groove 284 weakens the surface of the bore 282 so that such surface will distort more easily in response to forces exerted thereon when the second electrode is mounted in the bore 282. The groove 286 permits portions of the metal forming the electrode holder 98 to enter the taper formed on the second electrode 242. Where both grooves 284, 286 are formed, the pitch of the groove 286 is made different from that of the groove 284 so that both mechanisms enhancing the grip of the electrode holder 98 and the second electrode 242 come into play. Suitable pitches for the grooves 284 and 286 have been found to be 32 turns per inch and 48 turns per inch respectively. It has further been found that the grooves 284, 286 need not be deep; a suitable depth for either groove is approximately four thousandths inch.

The grip of the electrode holder 98 on the second electrode 242 can also be enhanced, without the grooves 284, 286, or further enhanced, when the grooves 284, 286 are provided, by forming a coating 288 of a relatively soft metal, such as electrolytically deposited silver, on the tapered end of the second electrode 242. (The thickness of the coating 288 has been exaggerated in FIG. 13). The coating 288 permits cold flow of the surface of the second electrode 242 that engages the bore 282 to further enhance the grip of the electrode holder 98 on the second electrode 242. A further advantage of the coating 288 is that it eliminates the need for lapping the tapered end of the second electrode 242 to cause the second electrode 242 to tightly mate with the bore 282 for good electrical contact between the second electrode 242 and the electrode holder 98. The coating 288 need not be thick; rather, it has been found that a suitable thickness for the coating 288 is from two ten thousandths inch to one thousandth inch.

An advantage of using cold flow of the metal forming the surface of the bore 282, or the coating 288, or both, to cause the electrode holder 98 to grip the second electrode 242 is that the surface of the bore 282 is brought into intimate contact with the surface of the tapered end of the second electrode 242 to provide good electrical and thermal contact therebetween. Such contact eliminates internal arcing between the electrode holder 98 and the second electrode 242 and, accordingly, eliminates pitting of the bore 282 and the tapered portion of the second electrode 242 that can result from such arcing. It will be noted that the grooves 284, 286 enhance such cold flow and, accordingly, facilitate the elimination of such arcing.

Figure 14:
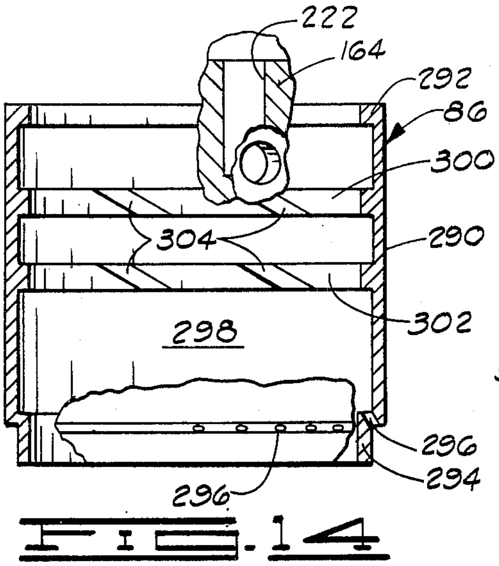
FIG. 14 is a cross-section in side elevation of the shield of the torch shown in FIG. 1 including fragmentary views of a portion of a side of the shield and of a portion of the torch barrel.

FIG. 14 is a cross-section of the shield 86 and has been provided to more clearly show the construction of the shield 86. Superimposed on this cross-section, at the upper end thereof, is a fragmentary view, partially in cross-section, of the block 164 of the barrel 32 to show the passages 220, 222 by means of which shield gas is introduced into the shield 86. Also superimposed on the cross-sectional view of the shield 86, at the lower end thereof, is a fragmentary view of the shield 86 as seen from above the drawing. In general, the shield 86 comprises a tubular wall portion 290 having an inside diameter slightly larger than the diameter of the block 164 of the torch barrel 32 so that, when the shield 86 is mounted on the block 164, an annular chamber can be formed between the wall portion 290 of the shield 86 and the periphery of the block 164. This chamber is closed at the upper end thereof by an end portion 292 which is sealed to the tubular sleeve 68 of the torch barrel 32 as by soldering the shield 86 to the sleeve 68. In the embodiment of the torch 30 shown in FIGS. 1 through 14, the shield 86 further comprises a second end portion 294, at the lower end of the tubular wall portion 290, the second end portion having the general form of a flanged tube and having a plurality of apertures 296 formed through the flange thereof to discharge shield gas generally toward the lower end 38 of the barrel 32. The tubular part of the second end portion 294 engages the periphery of the block 164 and extends a distance therealong to position the shield 86 such that the end portions 292, 294 coact to position the inner periphery 298 of the tubular wall portion 290 in a concentric, spaced relation with the surface of the block 164.

The annular chamber that is formed about the block 164 by the tubular portion 290 of the shield 86 is divided into portions (the compartments 214, 216 and 218 shown in FIG. 6) by two annular projections 300, 302 formed on the inner periphery 298 of the tubular wall portion 290, as shown in FIG. 14, and grooves 304 are formed in the projections 300, 302 to provide fluid communication between the compartments formed by the projections 300, 302 so that shield gas, introduced into the uppermost compartment, as described above, will be transmitted to the lower end of the shield 86 and discharged therefrom via the apertures 296. As further shown in FIG. 14, it is preferable that the grooves 304 be disposed at an angle to the axis of the wall portion 290 so that a swirling motion is imparted to the shield gas within the shield 86. Such motion distributes the shield gas, which is introduced in only one point in the upper compartment; that is, at the passage 220 in the block 164, substantially uniformly about the periphery of the block 164 in the lowermost compartment of the shield 86.

In a number of applications of the torch 30, the plasma jet issuing from the torch 30 will be directed against a work piece which is disposed in a confined space and, where such will be the case, it is advantageous to form the apertures 296 through only a portion of the second end member 294 of the shield 86 as has been shown in FIGS. 1, 6 and 14. In particular, as shown in FIG. 1, in the torch 30 the angle between the axis of the plasma jet; that is, the axis of the first electrode 172, and the axis of the barrel 32 is greater than zero degrees so that the plasma jet is directed to one side of the torch 30. When the torch 30 is to be used only on work pieces disposed in confined spaces, it is advantageous to extend the apertures only in an arc about a portion of the block 164 on a side of the barrel 32 opposite the side thereof to which the plasma jet is directed. Such placement of the apertures 296 prevents shield gas exiting the apertures 296 from interfering with the plasma jet while adequately shielding the work piece, such adequate shielding being the result of the confinement of the space wherein the portion of the work piece against which the plasma jet is directed or disposed. That is, the confinement of such space permits the shield gas to displace air within such space, thereby preventing contact between portions of the work piece subjected to the plasma jet and air. Where the torch 30 will be used for general applications wherein the work piece will generally not be disposed within a confined space, the apertures 296 can be extended in a complete circle about the block 164 of the torch barrel 32.

Assembly and Operation

It is advantageous to assemble the torch 30 in a particular manner which will result in the torch 30 having a particularly rugged construction and, for purposes of completeness, such manner of assembly will now be described. Initially, the upper block 46 of the manifold 44 and the spacer 50 thereof are constructed separately from the lower block 48 thereof so that the torch 30 can be assembled on the lower block 48 of the manifold 44 which is then mated, via the bolts 60, with remaining portions of the manifold 44. Conventional techniques are used in the construction of the parts of the manifold 44 so that such construction need not be discussed herein. Similarly, the insulating tube 228, the collar 238, and the electrode holder 98 are assembled as a separate unit by coating appropriate portions of the electrode holder 98 and the collar 238 with the ceramic cement 252 and then inserting the electrode holder 98 and collar into the insulating tube 228. (The braided conductor 116 is conveniently soldered to the electrode holder 98 prior to the assembly of the electrode holder 98 with the insulating tube 228 and the collar 238.) The bore 282 in the electrode holder 98 is then aligned with the aperture 240 and the collar 238, following which the cement 252 is permitted to set. (A suitable cement for use in assembling the insulating tube 228 and collar 238 to the electrode holder 98 is Thermeeze Ceramic Putty manufactured by Cotronics, Inc., Brooklyn, N.Y.).

The block 146 of the torch barrel 32 is constructed of copper bar stock having substantially the diameter of the major portion of the block 146 shown in FIG. 6 so that, during the greater portion of the assembly of the torch 30, the nozzle portion 166 thereof, such portion jutting to one side of the torch barrel 32, is absent from the block 146. Otherwise, the block 164 will have been shaped and provided with the bores and passages described above preparatory to the assembly of the barrel 32, and portions of the torch 30 within the sleeve 68 thereof, on the lower block 48 of the manifold 44 as will now be described.

The torch barrel 32 and portions of the torch 30 which extend through the sleeve 68 thereof are initially formed into a skeletal structure extending between the lower block 48 of the manifold 44 and the block 164 of the barrel 32 by inserting the coolant tubes 124 and 130, the sheath 154 of the electrode holder mounting assembly 78, and the material feed tube 148 in preformed bores, shown in FIGS. 3 and 4, of the lower block 46 of the manifold 44 and brazing or welding the coolant tubes 124, 130, the sheath 154 and the material feed tube 148 to the lower block 46 of the manifold 44. The block 146 of the barrel 32 is then mounted on this skeletal structure by inserting the sheath 154 into the bore 224 of the block 164 and inserting the coolant tubes 124, 130 and material feed tube 148 into the passages provided therefor in the block 164. The sheath 154 and the tubes 124, 130 and 148 are then brazed, or welded, to the block 164 so that a rigid connection is formed between the block 164 of the torch barrel 32 and the lower block 46 of the manifold 44.

Following the connection of the two blocks 46 and 164, the heat transfer assembly 152 can be formed between the sheath 154 and the coolant tubes 124 and 130 as has been shown in FIG. 5. Thereafter, the tubular sleeve 68 is slipped over the block 164 and moved into the bore 62 at the lower block 46 of the manifold 44, with the metal chips 162 being introduced into the sleeve 68 prior to the completion of the insertion of the sleeve 68 into the bore 62. The sleeve 68 is then brazed or welded to a lower block 46 of the manifold 44 and, preferably, soldered to the block 164. The shield 86 is then slipped over the lower end 38 of the barrel 32 and soldered to the sleeve 68 and to the block 146. The barrel 32 is then completed by brazing a ring to the block 164, concentrically with preformed portions of the bore 168 near the lower end 38 of the barrel 32 to form the nozzle portion 166 of the block 164 of the barrel 32. Following this assembly of the barrel 32, components of the torch 30 contained therein, and the lower block 48 of the manifold 44 into a unit, such unit is provided with a hard chrome plate; that is, a coating of electrolytically deposited chromium having a thickness greater than one thousandth inch, to provide additional strength to the torch 30.

Following the construction of the torch barrel 32 on the lower block 46 of the manifold 44, the electrode holder 98, cemented to the collar 238 and insulating tube 228 as described above, can be mounted in the torch barrel 32 by inserting the unit comprising these components through the bore 232 (FIG. 4) in the lower block 48 of the manifold 44 so that the collar 238 and electrode mounting end 226 of the electrode holder 98 pass through the sheath 154 and into the bore 224 of block 164 to the position shown in FIG. 6. The silicone rubber sleeve 262 is then formed as described above and allowed to cure. During the curing of the sleeve 262, the electrode holder 98 is held in a position such that the electrodes 172, 242 will be coaxial in the finished torch 30 by a cylindrical fixture (not shown) which axially receives the second electrode 242 and engages the bore 168 in the lower end at the barrel 32, the second electrode 242 having been mounted in the bore 282, and seated therein by pressing such electrode 242 into the bore 282 and turning the electrode 242 through one quarter to one half turn, while the silicone rubber cement of which the sleeve 262 is formed is still in a fluid state. Once the sleeve 262 has cured, the fixture is removed and the first electrode is inserted into the bore 168.

The final step in the assembly of the torch 30 is the assembly of the manifold 44 and the provision of an electrical connection to the electrode holder 98. To this end the braided wire conductor 116 is soldered to the connector 114; the connector 114 is passed through the chamber 76 in the spacer 50; and the bolt 112, extending through the hole 110 in the electrode block 104, is screwed into the connector 114. The manifold 44 is then bolted together with the electrode block 104 and the insulator 102 disposed in the bore 100 as shown in FIG. 3.

Electrical power for operation of the torch 30 can be provided by any suitable power supply used with conventional transferred arc plasma torches. It is common practice in such power supplies to extend electrical leads through one or both of conduits by means of which coolant is circulated through plasma torches with which such power supplies are used so that, in usual practice, the power supply is connected to the torch 30 by connecting the torch 30 to conduits which supply coolant thereto. In particular, electrical power is supplied to the first electrode 172 via the barrel 32 which mounts the first electrode 172, the lower block 48 of the manifold 44 on which the barrel 32 is mounted, and the bolts which are used to assemble the manifold 44, such bolts electrically connecting the lower block 48 thereof to the upper block 46 thereof on which the tube 138 is mounted. Electrical power is supplied to the second electrode 242 via the tube 126, the electrode block 104 in which the tube 126 is mounted, the bolt 112, the connector 114, the braided wire 116 and the electrode holder 98. Should one or both of the electrical leads from the power supply be separate from the coolant conduits, equivalent connections can be made to the bolt 60 (in place of the connection to the tube 138), to the bolt 112 (in place of the connection to the tube 126), or both, in accordance with the manner in which electrical power is made available by the power supply.

During operation of the torch 30, the plasma formed between the second electrode 242 and the work piece, when the main current is established therebetween, will, as in conventional torches heat portions of the torch 10 about the lower end 38 of the barrel 32 and such heating will generally give rise to thermal expansion of such portion of the torch 30 and, in particular, of the electrode holder 98. However, since the electrode holder 98 is secured to the barrel 32 at the electrode mounting end 226 thereof, expansion of the electrode holder 98 will have the effect only of repositioning the upper end of the electrode holder 98 to which the braided wire conductor 116 is attached, such end of the electrode holder 98 being free to float by the support of the electrode holder 98 at the electrode mounting end 226 thereof, so that the coaxial relationship of the electrodes 172 and 242 will be maintained throughout the operation of the torch 10.

Description of FIGS. 15–18

FIGS. 15 through 18 illustrate a second embodiment of a torch constructed in accordance with the present invention and designated 30*a* in FIG. 13. Portions of the torch 30*a*, near the lower end of the barrel 32*a* thereof have been modified such that the plasma jet exits the barrel 32*a* along an axis 40*a* which is selected to be at an angle at substantially 90° to the axis of the barrel 32*a*. The torch 30*a* also illustrates a second means of forming the nozzle portion of the block 164*a*, the block 164*a* forming the lower portion of the barrel 32*a*. Otherwise, the torch 30*a* is substantially identical to the torch 30 so that it will not be necessary to describe all elements of the torch 30*a*. Rather, elements of the torch 30*a* which are identical to elements of the torch 30 are identified in FIG. 15 by the numerical designations used to identify such elements in the description of the torch 30 and the discussion of the torch 30*a* will be limited to a discussion of those features and elements of the torch 30*a* which differ from corresponding features and elements of the torch 30. Elements of the torch 30 which have been incorporated in the torch 30*a* in modified form will be identified by the same numbers used for such elements in the description of the torch 30 followed by the letter a.

Figure 15:
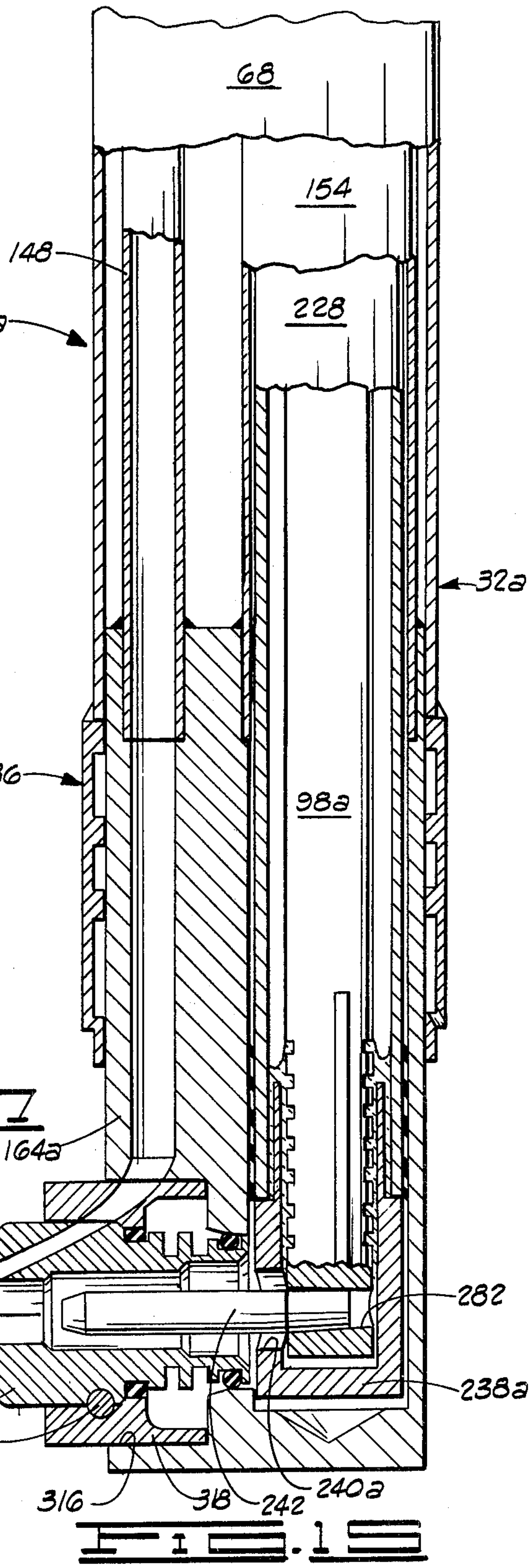
FIG. 15 is a cross-section in side elevation and partial cutaway of a portion of a second embodiment of a torch constructed in accordance with the present invention.
Figure 16:
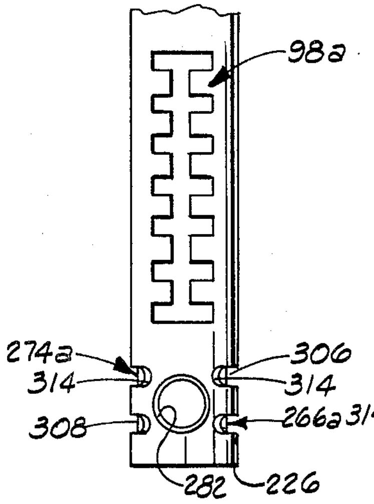
FIG. 16 is a front elevational view of a portion of the electrode holder of the torch shown in FIG. 15.
Figure 17:
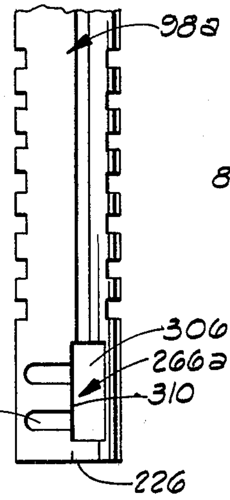
FIG. 17 is a side elevational view of the portion of the electrode holder shown in FIG. 16.
Figure 18:
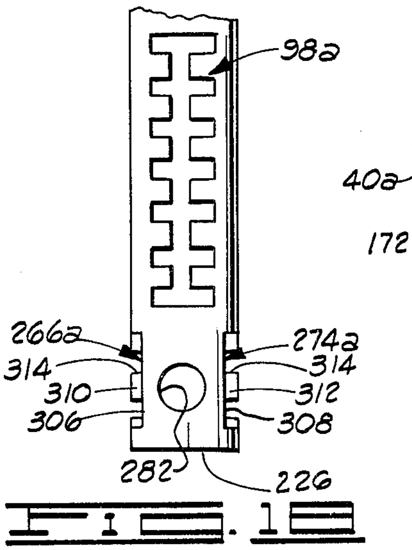
FIG. 18 is a rear elevational view of the portion of the electrode holder shown in FIG. 16.

In the torch 30*a*, portions of the electrode holder 98*a* near the electrode mounting end 226 thereof are shaped differently from corresponding portions of the electrode holder 98 and FIGS. 16 through 18 have been provided to show such differences. In particular, as shown in these Figures, the tapered bore 282, by means of which the second electrode 242 is mounted in the electrode holder 98*a*, is formed in the electrode holder 98*a* at substantially a right angle to the axis of the electrode holder 98*a* and the grooves 266*a* and 274*a*, forming plenums for the discharge of plasma forming gas about the second electrode 242, have been modified so that the long axes of the grooves 266*a* and 274*a* will, like the grooves 266 and 274 in the electrode holder 98, extend in a plane which is substantially perpendicular to the bore 282 in the electrode holder 98*a*. A particularly convenient manner for forming the grooves 266*a* and 274*a* is to form cuts 306, 308 parallel to the axis of the electrode holder 98*a* along chords thereof such that the cuts extend to the side of the electrode holder 98*a* opposite the side thereof into which the second electrode 242 is inserted and terminate at the faces, 310 and 312 respectively, which extend substantially radially of the electrode holder 98*a*. These faces are then interrupted, as is particularly shown in FIG. 18, by channels 314 (see, in particular, FIG. 17) which extend to portions of the surface of the electrode holder 98*a* located about the end of the bore 282 into which the second electrode 242 is inserted (see, in particular, FIG. 16). As shown in FIG. 15, the aperture 240 in the ceramic collar 238*a*, through which the second electrode 242 passes, is formed in the side of the collar 238*a* so as to be concentric with the bore 282 when the electrode holder 98 is cemented into the insulating tube 228 and collar 238*a*. In the torch 30*a*, the nozzle portion of the block 164*a*, that juts to the side of the torch, is formed by providing an oversized bore 316 in the side of the remaining portions of the block 164*a* and soldering a collar 318 into the bore 316 after such remaining portions of the block 164*a* have been assembled with the coolant tubes 124, 130 (not shown in FIGS. 15 through 18), the sheath 154, the material feed tube 148 and the tubular sheath 68 in the manner that has been described above. The pin 174, used to secure the first electrode 172 to the barrel 32*a* passes through a hole 320 in the collar 318 so that the assembly of the torch 30*a*, as well as the operation thereof, is substantially identical to the assembly and operation of the torch 30.

Description of FIGS. 19 through 26

FIGS. 19 through 26 similarly show another embodiment of the torch, designated 30*b*, of the present invention which, like the torch 30*a*, differs from the torch 30 in the mounting of the electrodes in the barrel and which further differs from the torch 30 in the supply of plasma forming gas, shield gas, and coolant to the lower end of the torch. Thus, only those features and elements of the torch 30*b* that differ from corresponding features and elements of the torches 30 and 30*a* will be described herein. Features and elements of the torch 30*b* which are the same as features and elements of the torch 30 will be identified using the same numerical designations previously used for such features and elements in the description of the torch 30. Elements of the torch 30 which have been incorporated into the torch 30*b* in modified form will be identified by the same numbers used for such elements in the description of the torch 30 followed by the letter b.

In the torch 30*b*, the angle between the axis of the barrel 32*b* and the axis 40*b* of the first electrode 172*b* is selected to be zero degrees; that is, the plasma jet is directed axially from the lower end 38 of the barrel 32*b*. The first electrode 172*b* differs from the electrode 172 in that an additional groove 198 is provided in the outer periphery thereof to smooth the flow of coolant, which enters the chamber 206 substantially perpendicularly to the annular extent of such chamber, about the first electrode 172*b* so as to inhibit turbulence which could result in hot spots being formed in portions of the first electrode 172*b*. The block 146*b* of the barrel 32*b* is also provided with a different form of coolant passages 208*b* and 210*b* as has been shown in FIGS. 21 and 22. As indicated therein, each of the passages 208*b* and 210*b* is formed by drilling two holes into the block 164*b*, from the upper end 194 of the block 164*b*, and removing material between the two holes. When the torch 30*b* is assembled, each coolant tube 124, 130 extends into one of the holes forming each of the passages 208*b*, 210*b* and the other hole is plugged at the upper end 194 of the block 164*b*. The form of the passages 208*b*, 210*b* provides for more effective utilization of portions of the block 164*b* which are available for transmitting coolant to the passage 206 so that the coolant carrying capacity of the torch can be increased and, moreover, smaller holes can be used in forming the passages 208*b*, 210*b* so that the axis of the electrode holder 98*b* can be positioned nearer the axis of the barrel 32*b* than is the case for the torches 30 and 30*a* with the result that the plasma jet is directed very nearly along the axis of the barrel 32*b* in the torch 30*b*.

Figure 19:
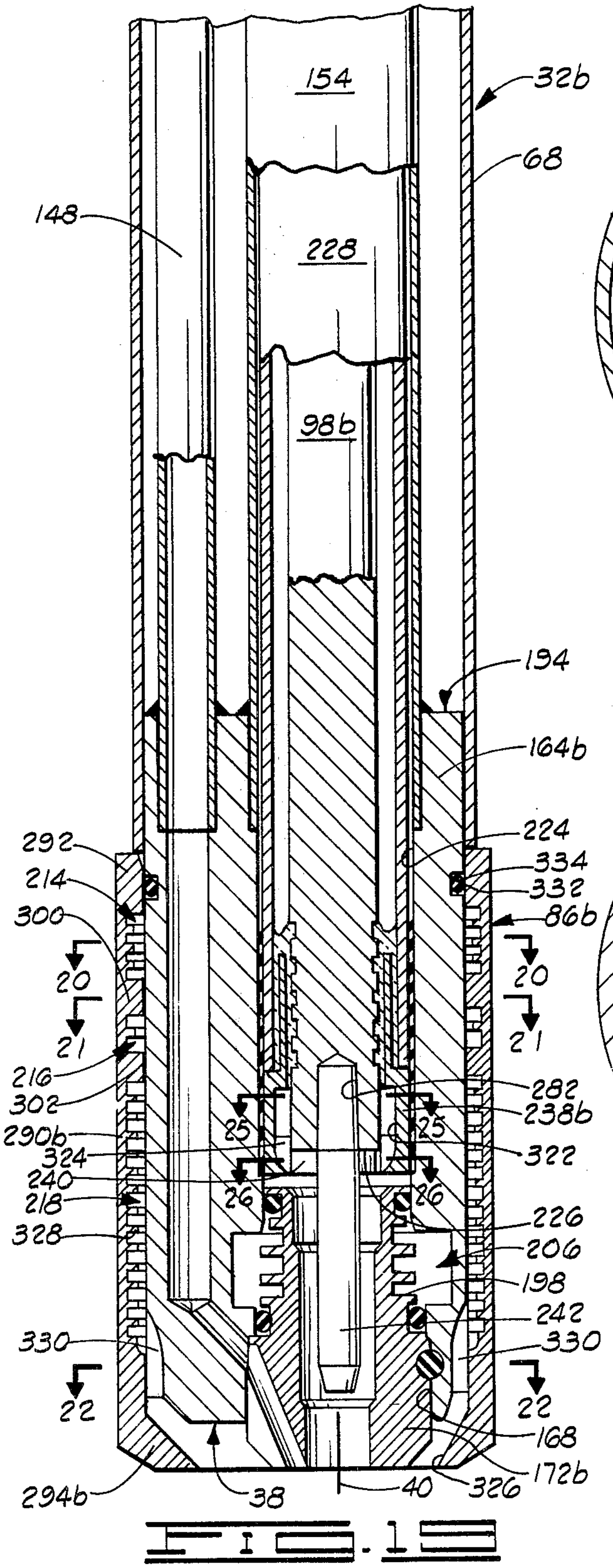
Figure 20:
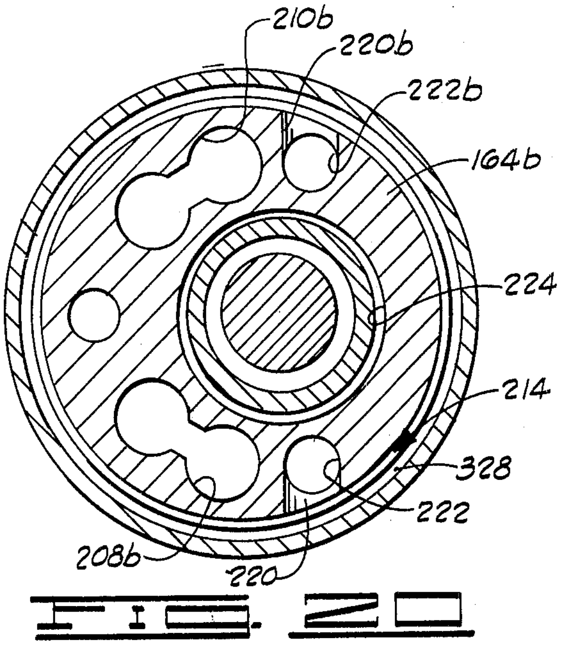
FIGS. 20, 21 and 22 are transverse cross-sections of the barrel of the torch shown in FIG. 19 taken along lines 20—20, 21—21 and 22—22 of FIG. 19.
Figure 23:
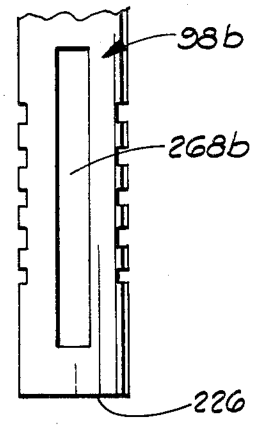
FIG. 23 is a side elevational view of a portion of the electrode holder of the torch shown in FIG. 19.
Figure 24:
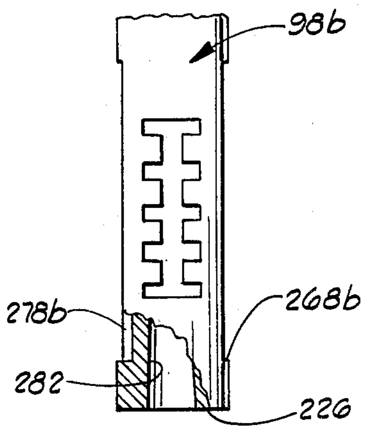
FIG. 24 is a side elevational view in partial cross-section of the portion of the electrode holder shown in FIG. 23 as viewed from a different direction.
Figure 25:
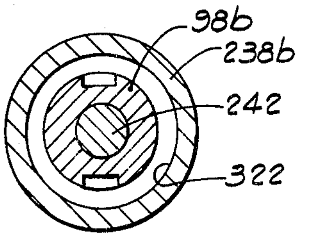
FIGS. 25 and 26 are transverse cross-sections of portions of the electrode holder mounting assembly of the torch of FIG. 19 taken along lines 25—25 and 26—26 of FIG. 19.
Figure 26:
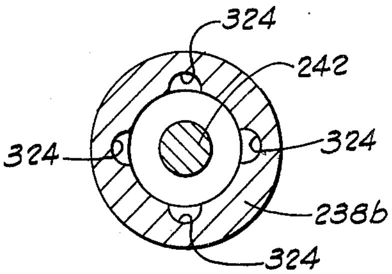

In order that the axis of the second electrode 242 be coincident with the axis 40 of the first electrode 172*b* in the torch 30*b*, the bore 282 in the electrode holder 98*b* is formed in the electrode mounting end 226 of the electrode holder 98*b* and extends axially into the electrode holder 98*b* as has been shown in FIG. 19 and also FIG. 24 which, with FIG. 23, has been provided to show the structure of portions of the electrode holder 98*b* adjacent the electrode mounting end 226 thereof. It will be noted in these Figures that grooves, comparable to the grooves 266 and 274 in the electrode holder 98, are absent from the electrode holder 98*b*. Rather, the electrode holder 98*b* is provided only with channels 268*b* and 278*b*, corresponding to the channels 268 and 278 in the electrode holder 98, which accomplish only a portion of the transmission of plasma forming gas to the plasma chamber about the second electrode 242. Such transmission is completed by an annular groove 322, shown in FIGS. 19 and 25, formed in the inner periphery of the ceramic collar 238*b* and channels 324 (FIG. 26), also formed in the inner periphery of the collar 238*b*, which extend from the groove 322 to the aperture 240, which in the torch 30*b*, is formed through the lower end of the collar 238*b* coaxially with the bore 282 in the electrode holder 98*b*. Thus, the groove 322 coacts with the periphery of the electrode holder 98*b* to form a plenum thereabout; the channels 268*b* and 278*b* transmit plasma forming gas introduced into the insulating tube 228 to such plenum; and the channels 324 then discharge the gas from the plenum in the manner that the channels 270, 272, 278 and 280 formed in the electrode holder 98 discharge gas from the plenums formed by the grooves 266 and 274 made in the sides of the electrode holder 98.

The shield 86*b* of the torch 30*b* also has a modified form as has been indicated in FIG. 19. As shown therein, the compartment 218 in the shield 86*b* is extended such that the tubular wall portion 290 of the shield 86*b* extends to a ring shaped end portion 294*b* of the shield 86*b*, such end portion 294*b* forming an annular opening 326 about the bore 168 formed in the lower end 38 of the barrel 32*b* to receive the second electrode 172*b*. The shield 86*b* further differs from the shield 86 in that annular ribs 328 (see also FIG. 20) are formed on the inner periphery of the tubular wall member 290*b* of the shield 86*b*, between the projection 300, 302 to even out the flow of shield gas about the periphery of the block 164*b* of the barrel 32*b*. It is also useful, for this purpose, to introduce shield gas into the shield 86*b* from two points on the periphery of the block 164*b* and such is accomplished as has been shown in FIG. 20. As shown therein, the block 164*b* is provided, in addition to the passages 220 and 222, passages 220*b* and 222*b* which are formed in mirror image to the passages 220, 222 in the block 164*b*. As in the case of the torch 30, the passage 222 and, in the torch 30*b*, the passage 220*b* intersect the upper end 194 of the block 164*b* to receive shield gas introduced into the tubular sleeve 68 and such shield gas is then discharged, via the passages 220 and 220*b*, into the upper compartment 214 of the shield 86*b*.

Figure 21:
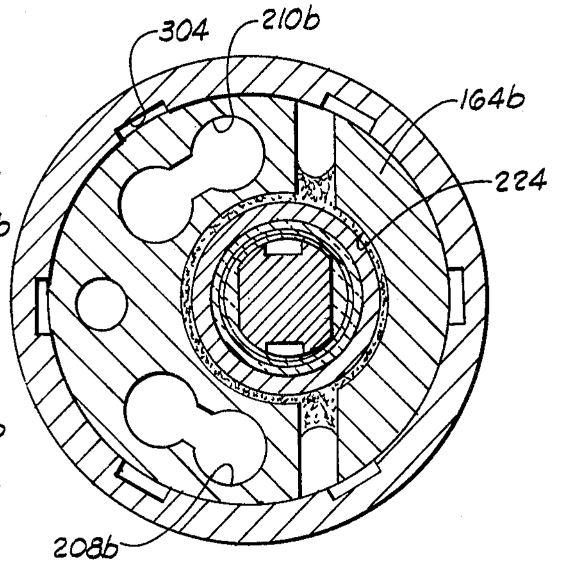

Fluid transmission between the compartments 214–218 in the shield 86*b* is accomplished in the same manner that such transmission is accomplished in the shield 86; that is, by means of grooves 304 formed in the annular projections 300, 302 mounted on the inner periphery of the tubular portion 290*b* of the shield 86*b* and such has been shown in FIG. 21 which shows a transverse cross-section of the torch 30*b* through the projection 300.

Figure 22:
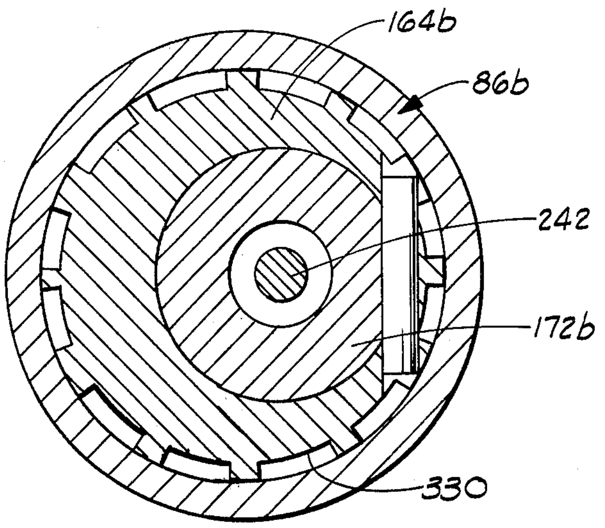

FIG. 22 has been provided to show, with FIG. 19, the shaping of portions of the block 164*b* near the lower end 38 of the barrel 32*b* to permit discharge of the shield gas about the axis of the bore 168 which mounts the first electrode 172*b*. As seen in these drawings, a plurality of slots 330 are formed in the periphery of the block 164*b* and the slots 330 extend upwardly a distance in the block 164*b*, a distance sufficient to communicate with the lower portion of the compartment 218 of the shield 86*b* so that shield gas is discharged, in a generally circular pattern, from the annular opening 326.

FIG. 19 also illustrates a different mode of mounting the shield 86 on the block 164*b* of the barrel 32*b* and sealing the upper end portion of the shield 86*b* to the block 164*b*. In the torch 30*b*, an annular groove 332 is formed in the periphery of the block 164*b* slightly below the sleeve 68 and an O-ring 334 is disposed in the groove 332 so that the shield 86*b* need not be soldered to the barrel 32*b*. Rather, the shield 86*b* slides on to the lower end of the barrel 32*b* and the O-ring 334 engages the end portion 292 of the shield 86*b* to hold the shield 86*b* on the barrel 32*b* and to form a seal between upper portions of the shield 86*b* and the barrel 32*b*.

It is clear that the present invention is well adapted to carry out the objects and obtain the ends and advantages mentioned as well those inherent therein. While presently preferred embodiments of the invention have been described for purposes of this disclosure, numerous changes may be made which will readily suggest themselves to those skilled in the art and which are encompassed within the spirit of the invention disclosed and as defined in the appended claims.

What is claimed is:

1. An improved plasma torch, comprising:

an elongated barrel;

a tubular first electrode mounted at one end of the barrel, the axis of the first electrode oriented at a selected angle to the axis of the barrel;

a rod-like, electrically conducting electrode holder extending axially through the barrel to terminate in an electrode mounting end adjacent one end of the first electrode;

means for fixing portions of the electrode holder near said electrode mounting end thereof to the barrel, remaining portions of the electrode holder being slidably supported within the barrel, wherein a bore substantially coaxial with the bore of the first electrode is formed in the electrode holder; and a second electrode having one end thereof shaped to mate with the bore formed in the electrode holder, said one end of the second electrode disposed in the bore in the electrode holder, and the second electrode extending from the electrode holder a preselected distance into the first electrode;

wherein the electrode holder and the second electrode are formed of dissimilar metals, the electrode holder being constructed of a metal softer than the second electrode; wherein a tapered surface is formed on the end of the second electrode disposed within the bore of the electrode holder and said bore has a tapered surface to mate with said tapered surface of the second electrode.

2. The torch of claim 1 wherein the means for fixing the electrode holder to the barrel comprises:

a tube, formed of an insulating material, wherein the electrode holder is disposed, portions of the electrode holder near the electrode mounting end thereof being secured to the inner periphery of said tube; and a silicone rubber sleeve adhered to portions of said tube near the electrode mounting end of the electrode holder and adhered to portions of the barrel near said one end of the first electrode adjacent the electrode holder.

3. The torch of claim 2 further comprising:

means for introducing plasma forming gas into the tube wherein the electrode holder is disposed; and a ceramic collar having a portion extending about the electrode mounting end of the electrode holder and having a portion extending a preselected distance into said tube coaxially with the electrode holder; wherein an aperture is formed through said collar coaxially with the bore in the electrode holder; wherein two elongated grooves are formed end opposite sides of the electrode holder near the electrode mounting in thereof, the long axes of said grooves extending in a plane substantially perpendicular to the axis of the bore in the electrode holder and the grooves coacting with the inner surface of the collar to form two plenums on opposite sides of the electrode holder; wherein a plurality of channels substantially parallel to the axis of the bore in the electrode holder are formed in the surface thereof to fluidly communicate the plenums with the aperture formed in the collar; and wherein two channels substantially parallel to the axis of the electrode holder are formed in opposite sides thereof so as to fluidly communicate the plenums with portions of the interior of said tube disposed a greater distance from the electrode mounting end of the electrode holder than said portion of the collar extending into said tube.

4. The torch of claim 1, 2 or 3 wherein the selected angle between the axes of the first electrode and the barrel is substantially 45°.

5. The torch of claim 1, 2 or 3 wherein the selected angle between the axes of the first electrode and the barrel is substantially 90°.

6. The torch of the claim 2 further comprising:

means for introducing plasma forming gas into the tube wherein the electrode holder is disposed; and a ceramic collar having a portion extending about the electrode mounting end of the electrode holder and having a portion extending a preselected distance into said tube coaxially with the electrode holder;

wherein an aperture is formed through said collar coaxially with the bore formed in the electrode holder; wherein a circular groove is formed in the inner surface of the collar, about the electrode holder, said groove displaced from said aperture formed through the collar to coact with the surface of the electrode holder to form a plenum about the electrode holder; wherein a plurality of channels are formed in the inner surface of the collar to fluidly communicate the plenum with said aperture; and wherein at least one channel is formed in the surface of the electrode holder parallel to the axis thereof so as to fluidly communicate the plenum with portions of the interior of said tube disposed a greater distance from the electrode mounting end of the electrode holdeer than said portion of the collar extending into said tube.

7. The torch of claim 1, 2 or 6 wherein the selected angle between the axes of the first electrode and the barrel is substantially 0°.

8. The torch of claim 1 wherein the cone angle of said tapered surfaces is in the range of from 1° to 7°.

9. The torch of claim 1 wherein a spiral groove is formed in at least one of said tapered surfaces.

10. The torch of claim 9 wherein a spiral groove is formed in each of said tapered surfaces, the groove formed in the tapered surface on the second electrode having a pitch differing from the pitch of the spiral groove formed in the tapered surface of the bore in the electrode holder.

11. The torch of claim 1, 8, 9 and 10 wherein the tapered surface on the second electrode is provided with a coating of a metal softer than the metal of which the second electrode is constructed.

12. The torch of claim 1 wherein the barrel is further characterized as comprising:

a tubular sleeve; and a cylindrical block mounted on the sleeve at said one end of the barrel whereat the first electrode is mounted, the block having one end disposed within the tubular sleeve and the block extending therefrom substantially coaxially with the sleeve, the block having a bore formed near the other end thereof for receiving the first electrode so as to mount the first electrode on the barel, the block having a circular groove formed in the periphery of said bore to extend circumferentially about the first electrode, and the block having two coolant passages formed therein to intersect said one end of the block disposed within the tubular sleeve and to intersect opposite sides of said groove about the first electrode; and wherein the torch further comprises:

a first coolant tube extending through the sleeve and sealed to portions of the block about one of the coolant passages;

a second coolant tube extending through the sleeve and sealed to portions of the block about the other of the coolant passages;

a sheath extending through the sleeve about the electrode holder; and a heat transfer assembly interconnecting the sheath and the coolant tubes, said heat transfer assembly comprising a plurality of copper wires embedded in a solder matrix.

13. The torch of claim 12 further comprising a plurality of metal chips disposed with the tubular sleeve about the sheath and coolant tubes.

14. The torch of claim 1 wherein the barrel is further characterized as comprising:

a tubular sleeve; and a cylindrical block mounted on the sleeve at said one end of the barrel whereat the first electrode is mounted, the block having one end thereof disposed within the tubular sleeve and the block extending therefrom substantially coaxially with the sleeve, the block having a bore formed near the other end thereof for receiving the first electrode so as to mount the first electrode on the barrel, the block having a circular groove formed in the periphery of said bore to extend circumferentially about the first electrode, and the block having two coolant passages formed therein to intersect said one end of the block disposed within the circular sleeve and to intersect opposite sides of said groove about the first electrode; and wherein the torch further comprises:

a first coolant tube extending through the sleeve and sealed to portions of the block about one of the coolant passages;

a second coolant tube extending through the sleeve and sealed to portions of the block about the other of the coolant passages;

a sheath extending through the sleeve about the electrode holder; and a plurality of metal chips disposed within the tubular sleeve about the sheath and coolant tubes.

15. The torch of claim 12, 13 or 14 further comprises:

means for introducing a shield gas in to said tubular sleeve; and a tubular shield mounted on the block to extend circumferentially thereabout, the shield having a tubular wall portion, disposed substantially concentrically with the outer periphery of the block and separated a preselected distance therefrom so as to form an annular chamber about portions of the block, and an end portion sealed to the barrel adjacent the tubular sleeve, the wall portion having a plurality of annular lands formed on the inner periphery thereof, said lands engaging the outer periphery of the block and extending circumferentially thereabout and said lands having grooves formed therein so as to provide fluid communication between portions of said annular chamber separated by said lands; and wherein a passage is formed through said block to fluidly communicate portions of said annular chamber between said end portion and the annular land nearest said end portion to the interior of the tubular sleeve.

16. The torch of claim 15 wherein the grooves in the annular lands are disposed at an angle to the axis of the wall portion of the shield.

17. The torch of claim 15 wherein the shield is characterized as having a second end portion sealed to the block between the tubular sleeve and the first electrode, said second end portion having a plurality of apertures formed therethrough to discharge shield gas about portions of the barrel wherein the first electrode is mounted.

18. The torch of claim 17 wherein the angle between the axis of the first electrode and the axis of the barrel is greater than zero degrees, whereby the torch produces a plasma jet directed to one side of the barrel, and wherein the apertures through the second end portion of the shield are provided only in an arc about a portion of the block on a side of the barrel opposite the side of the barrel to which the plasma jet is directed.

19. The torch of claim 15 wherein the shield is further characterized as having a portion, opposite said end portion, forming an annular opening extending about the bore in the cylindrical block wherein the first electrode is mounted.

20. The torch of claim 1 wherein the barrel is further characterized as comprising:

a tubular sleeve; and a cylindrical block mounted on the sleeve at said one end of the barrel whereat the first electrode is mounted the block having a bore formed therein for receiving the first electrode;

wherein the torch further comprises:

means for introducing shield gas into said tubular sleeve; and a tubular shield mounted on the block to extend circumferentially thereabout, the shield having a tubular wall portion, disposed substantially concentrically with the outer periphery of the block and separated a preselected distance therefrom so as to form an annular chamber about portions of the block, and an end portion sealed to the barrel adjacent the tubular sleeve, the wall portion having a plurality of annular projections formed on the inner periphery thereof, said projections engaging the outer periphery of the block and extending circumferentially thereabout and said projections having grooves formed therein so as to provide fluid communication between portions of said annular chamber separated by said projections, and wherein a passage is formed through said block to fluidly communicate portions of said annular chamber between said end portion and the annular projections nearest said end portion to the interior of the tubular sleeve.

21. The torch of claim 20 wherein the grooves in the annular projections are disposed at an angle to the axis of the wall portion of the shield.

22. The torch of claim 20 wherein the shield is characterized as having a second end portion sealed to the block between the tubular sleeve and the first electrode, said second end portion having a plurality of apertures formed therethrough to discharge shield gas about portions of the barrel wherein the first electrode is mounted.

23. The torch of claim 22 wherein the angle between the axis of the first electrode and the axis of the barrel is greater than zero degrees, whereby the torch produces a plasma jet directed to one side of the barrel, and wherein the apertures through the second end portion of the shield are provided only in an arc about a portion of the block on a side of the barrel opposite the side of the barrel to which the plasma jet is directed.

24. The torch of claim 20 wherein the shield is further characterized as having a portion, opposite said end portion, forming an annular opening extending about the bore in the cylindrical block wherein the first electrode is mounted.

25. An improved plasma torch, comprising:

an elongated barrel;

a tubular first electrode mounted at one end of the barrel, the axis of the first electrode oriented at a selected angle to the axis of the barrel;

a rod-like, electrically conducting electrode holder extending axially through the barrel to terminate in an electrode mounting end adjacent one end of the first electrode;

means for fixing portions of the electrode holder near said electrode mounting end thereof to the barrel, remaining portions of the electrode holder being slidably supported within the barrel, wherein a bore substantially coaxial with the bore of the first electrode is formed in the electrode holder, the means for fixing the electrode holder to the barrel comprising:

a tube, formed of an insulating material, wherein the electrode holder is disposed, portions of the electrode holder near the electrode mounting end thereof being secured to the inner periphery of said tube; and a silicone rubber sleeve adhered to portions of said tube near the electrode mounting end of the electrode holder and adhered to portions of the barrel near said one end of the first electrode adjacent the electrode holder;

a second electrode having one end thereof shaped to mate with the bore formed in the electrode holder, said one end of the second electrode disposed in the bore in the electrode holder, and the second electrode extending from the electrode holder a preselected distance into the first electrode;

means for introducing plasma forming gas into the tube wherein the electrode holder is disposed; and a ceramic collar having a portion extending about the electrode mounting end of the electrode holder and having a portion extending a preselected distance into said tube coaxially with the electrode holder;

wherein an aperture is formed through said collar coaxially with the bore in the electrode holder; wherein two elongated grooves are formed in opposite sides of the electrode holder near the electrode mounting end thereof, the long axes of said grooves extending in a plane substantially perpendicular to the axis of the bore in the electrode holder and the grooves coacting with the inner surface of the collar to form two plenums on opposite sides of the electrode holder; wherein a plurality of channels substantially parallel to the axis of the bore in the electrode holder are formed in the surface thereof to fluidly communicate the plenums with the aperture formed in the collar; and wherein two channels substantially parallel to the axis of the electrode holder are formed in opposite sides thereof so as to fluidly communicate the plenums with portions of the interior of said tube disposed a greater distance from the electrode mounting end of the electrode holder than said portion of the collar extending into said tube.

26. An improved plasma torch, comprising:

an elongated barrel;

a tubular first electrode mounted at one end of the barrel, the axis of the first electrode oriented at a selected angle to the axis of the barrel;

a rod-like, electrically conducting electrode holder extending axially through the barrel to terminate in an electrode mounting end adjacent one end of the first electrode;

means for fixing portions of the electrode holder near said electrode mounting end thereof to the barrel, remaining portions of the electrode holder being slidably supported within the barrel, wherein a bore substantially coaxial with the bore of the first electrode is formed in the electrode holder, the means for fixing the electrode holder to the barrel comprising:

a tube, formed of an insulating material, wherein the electrode holder is disposed, portions of the electrode holder near the electrode mounting end thereof being secured to the inner periphery of said tube; and a silicone rubber sleeve adhered to portions of said tube near the electrode mounting end of the electrode holder and adhered to portions of the barrel near said one end of the first electrode adjacent the electrode holder;

a second electrode having one end thereof shaped to mate with the bore formed in the electrode holder, said one end of the second electrode disposed in the bore in the electrode holder, and the second electrode extending from the electrode holder a preselected distance into the first electrode;

means for introducing plasma forming gas into the tube wherein the electrode holder is disposed; and a ceramic collar having a portion extending about the electrode mounting end of the electrode holder and having a portion extending a preselected distance into said tube coaxially with the electrode holder;

wherein an aperture is formed through said collar coaxially with the bore formed in the electrode holder; wherein a circular groove is formed in the inner surface of the collar, about the electrode holder, said groove displaced from said aperture formed through the collar to coact with the surface of the electrode holder to form a plenum about the electrode holder; wherein a plurality of channels are formed in the inner surface of the collar to fluidly communicate the plenum with said aperture; and wherein at least one channel is formed in the surface of the electrode holder parallel to the axis thereof so as to fluidly communicate the plenum with portions of the interior of said tube disposed a greater distance from the electrode mounting end of the electrode holder than said portion of the collar extending into said tube.

27. An improved plasma torch, comprising:

an elongated barrel, comprising:

a tubular sleeve; and a cylindrical block mounted on the sleeve at one end of the barrel, the block having one end disposed within the tubular sleeve and the block extending therefrom substantially coaxially with the sleeve;

a second electrode having one end thereof shaped to mate with the bore formed in the electrode holder, said one end of the second electrode disposed in the bore in the electrode holder, and the second electrode extending from the electrode holder a preselected distance into the first electrode;

a first coolant tube extending through the sleeve and sealed to portions of the block about one of the coolant passages;

a second coolant tube extending through the sleeve and sealed to portions of the block about the other of the coolant passages;

a sheath extending through the sleeve about the electrode holder; and a heat transfer assembly interconnecting the sheath and the coolant tubes, said heat transfer assembly comprising a plurality of copper wires embedded in a solder matrix.

28. An improved plasma torch, comprising:

an elongated barrel, comprising:

a tubular sleeve; and a cylindrical block mounted on the sleeve at one end of the barrel, the block having one end thereof disposed within the tubular sleeve and the block extending therefrom substantially coaxially with the sleeve;

a tubular first electrode mounted at said one end of the barrel whereat said block is disposed, the axis of the first electrode oriented at a selected angle to the axis of the barrel, wherein the block of the barrel has a bore formed near the end thereof remote from the sleeve for receiving the first electrode so as to mount the first electrode on the barrel, the block having a circular groove formed in the periphery of said bore to extend circumferentially about the first electrode, and the block having two coolant passages formed therein to intersect said one end of the block disposed within the tubular sleeve and to intersect opposite sides of said groove about the first electrode;

a rod-like, electrically conducting electrode holder extending axially through the barrel to terminate in an electrode mounting end adjacent one end of the first electrode;

means for fixing portions of the electrode holder near said electrode mounting end thereof to the barrel, remaining portions of the electrode holder being slidably supported within the barrel, wherein a bore substantially coaxial with the bore of the first electrode is formed in the electrode holder; a tubular first electrode mounted at said one end of the barrel whereat said block is disposed, the axis of the first electrode oriented at a selected angle to the axis of the barrel, wherein the block of the barrel has a bore formed near the end thereof remote from the sleeve for receiving the first electrode so as to mount the first electrode on the barrel, the block having a circular groove formed in the periphery of said bore to extend circumferentially about the first electrode, and the block having two coolant passages formed therein to intersect said one end of the block disposed within the circular sleeve and to intersect opposite sides of said groove about the first electrode;

a rod-like, electrically conducting electrode holder extending axially through the barrel to terminate in an electrode mounting end adjacent one end of the first electrode;

means for fixing portion of the electrode holder near said electrode mounting end thereof to the barrel, remaining portions of the electrode holder being slidably supported within the barrel, wherein a bore substantially coaxial with the bore of the first electrode is formed in the electrode holder;

a second electrode having one end thereof shaped to mate with the bore formed in the electrode holder, said one end of the second electrode disposed in the bore in the electrode holder, and the second electrode extending from the electrode holder a preselected distance into the first electrode;

a first coolant tube extending through the sleeve and sealed to portions of the block about one of the coolant passages;

a second coolant tube extending through the sleeve and sealed to portions of the block about the other of the coolant passages;

a sheath extending through the sleeve about the electrode holder; and a plurality of metal chips disposed within the tubular sleeve about the sheath and coolant tubes.

29. An improved plasma torch, comprising:

an elongated barrel;

a tubular first electrode mounted at one end of the barrel, the axis of the first electrode oriented at a selected angle to the axis of the barrel, wherein the barrel comprises:

a tubular sleeve; and a cylindrical block mounted on the sleeve at said one end of the barrel whereat the first electrode is mounted the block having a bore formed therein for receiving the first electrode;

a rod-like, electrically conducting electrode holder extending axially through the barrel to terminate in an electrode mounting end adjacent one end of the first electrode;

means for fixing portions of the electrode holder near said electrode mounting end thereof to the barrel, remaining portions of the electrode holder being slidably supported within the barrel, wherein a bore substantially coaxial with the bore of the first electrode is formed in the electrode holder;

a second electrode having one end thereof shaped to mate with the bore formed in the electrode holder, said one end of the second electrode disposed in the bore in the electrode holder, and the second electrode extending from the electrode holder a preselected distance into the first electrode;

means for introducing shield gas into said tubular sleeve; and a tubular shield mounted on the block to extend circumferentially thereabout, the shield having a tubular wall portion, disposed substantially concentrically with the outer periphery of the block and separated a preselected distance therefrom so as to form an annular chamber about portions of the block, and an end portion sealed to the barrel adjacent the tubular sleeve, the wall portion having a plurality of annular projections formed on the inner periphery thereof, said projections engaging the outer periphery of the block and extending circumferentially thereabout and said projections having grooves formed therein so as to provide fluid communication between portions of said annular chamber separated by said projections and wherein a passage is formed through said block to fluidly communicate portions of said annular chamber between said end portion and the annular projection nearest said end portion to the interior of the tubular sleeve.

* * * * *